United States Patent
Kosuge et al.

(10) Patent No.: US 9,335,592 B2
(45) Date of Patent: May 10, 2016

(54) LIQUID CRYSTAL DISPLAY PANEL, LIQUID CRYSTAL DISPLAY, AND ELECTRONIC UNIT

(75) Inventors: Masahiro Kosuge, Nagano (JP); Shohei Naemura, Tottori (JP)

(73) Assignees: National University Corporation Tottori University, Tokyo (JP); Japan Display Inc., Tokyo (JP)

( * ) Notice: Subject to any disclaimer, the term of this patent is extended or adjusted under 35 U.S.C. 154(b) by 459 days.

(21) Appl. No.: 13/525,907

(22) Filed: Jun. 18, 2012

(65) Prior Publication Data
US 2013/0002990 A1 Jan. 3, 2013

(30) Foreign Application Priority Data
Jul. 1, 2011 (JP) .................. 2011-147160

(51) Int. Cl.
*G02F 1/1343* (2006.01)
*G02F 1/139* (2006.01)

(52) U.S. Cl.
CPC ........ *G02F 1/134363* (2013.01); *G02F 1/1393* (2013.01)

(58) Field of Classification Search
CPC ................................ G02F 1/134363
See application file for complete search history.

(56) References Cited

U.S. PATENT DOCUMENTS

| 6,266,109 B1 | 7/2001 | Yamaguchi et al. |
| 8,519,936 B2 * | 8/2013 | Kosuge .............. G02F 1/13306 345/101 |
| 2007/0285377 A1 | 12/2007 | Yamazaki |
| 2008/0002079 A1 * | 1/2008 | Kimura ......................... 349/42 |
| 2008/0191986 A1 | 8/2008 | Lee |
| 2009/0316098 A1 * | 12/2009 | Ishihara et al. ............... 349/131 |
| 2010/0321607 A1 * | 12/2010 | Utsumi et al. .................. 349/61 |

FOREIGN PATENT DOCUMENTS

| JP | 11-183937 A | 7/1999 |
| JP | 2001-249363 A | 9/2001 |
| JP | 2001-265298 A | 9/2001 |
| JP | 2005-215339 A | 8/2005 |
| JP | 2007-323046 A | 12/2007 |

* cited by examiner

*Primary Examiner* — Jessica M Merlin
(74) *Attorney, Agent, or Firm* — Wolf, Greenfield & Sacks, P.C.

(57) ABSTRACT

A liquid crystal display panel includes: a liquid crystal layer including a liquid crystal material with positive dielectric constant anisotropy; a vertical alignment film being in contact with the liquid crystal layer; a first substrate and a second substrate disposed to face each other with the liquid crystal layer in between; and an electrode disposed on a surface of one or both of the first substrate and the second substrate and generating, in the liquid crystal layer, an electric field in a direction orthogonal to or intersecting with a normal to the first substrate.

9 Claims, 22 Drawing Sheets

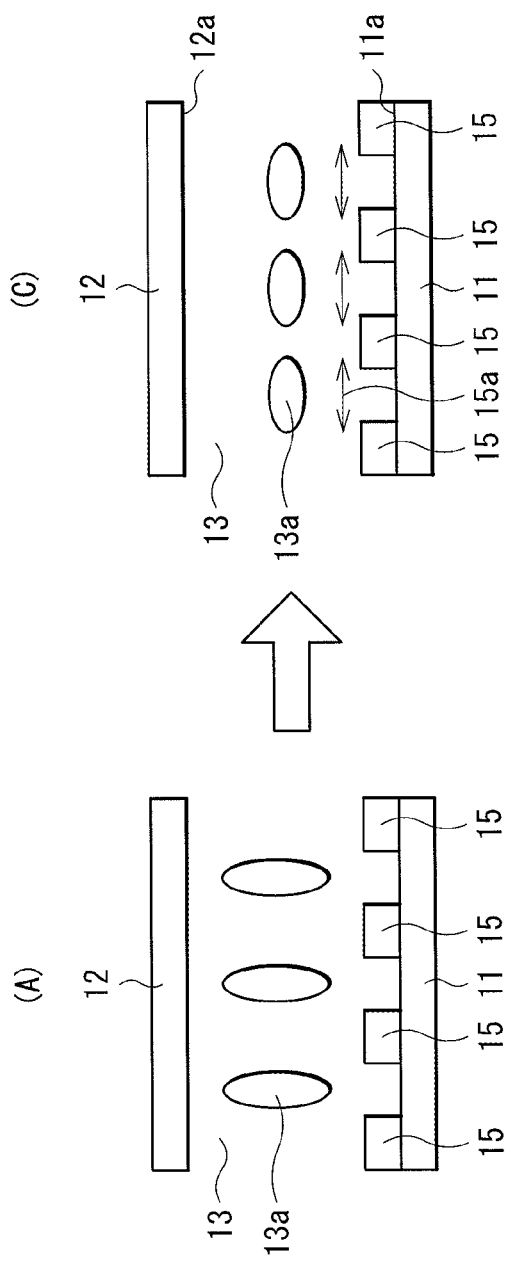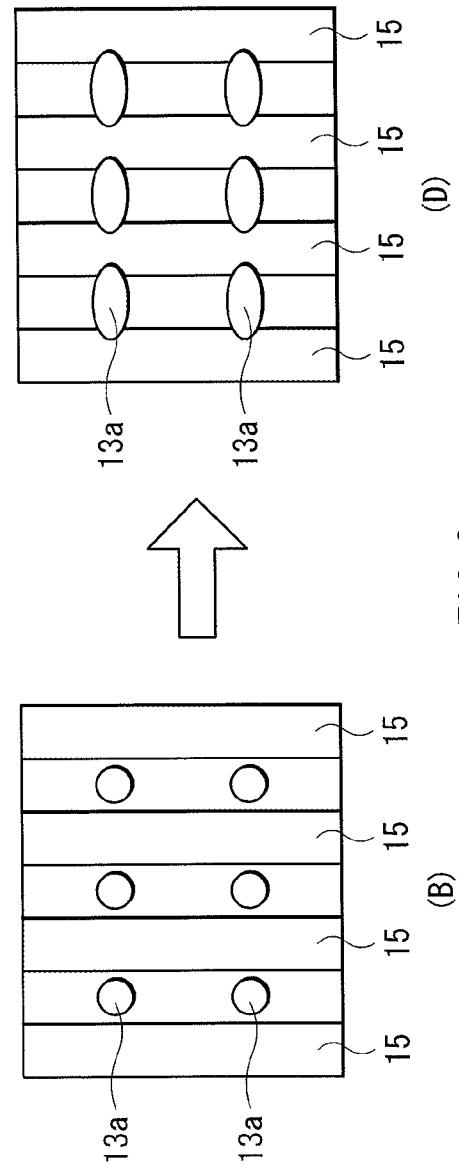
FIG. 3

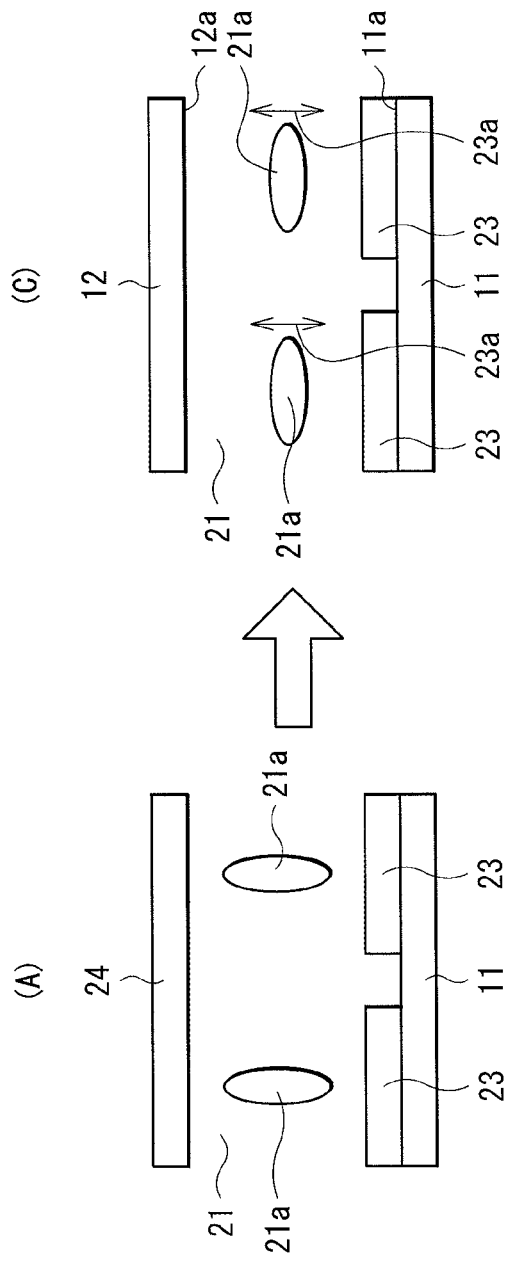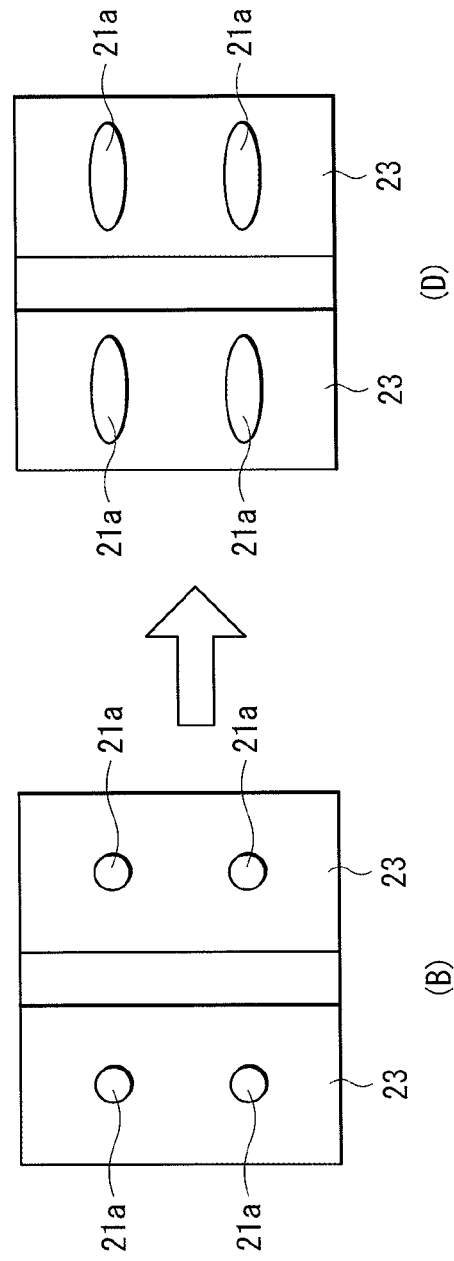
FIG. 15

LIQUID CRYSTAL DISPLAY PANEL, LIQUID CRYSTAL DISPLAY, AND ELECTRONIC UNIT

BACKGROUND

The present technology relates to a liquid crystal display panel including a liquid crystal layer, and a liquid crystal display including the liquid crystal display panel. Moreover, the present technology relates to an electronic unit including the above-described liquid crystal display as a display section.

As liquid crystal displays have characteristics including a lighter weight, a smaller thickness, and lower power consumption, compared to CRTs (cathode-ray tubes), liquid crystal displays are used in many electronic units as displays. As classifications of liquid crystal displays in related art based on a method of applying an electric field to a liquid crystal layer, a vertical electric field mode and a horizontal electric field mode are known.

In vertical electric field mode liquid crystal displays, an electric field in a substantially vertical direction is applied to liquid crystal molecules by a pair of electrodes which are arranged with a liquid crystal layer in between. As the vertical electric field mode liquid crystal displays, TN (Twisted Nematic) mode liquid crystal displays, STN (Super Twisted Nematic) mode liquid crystal displays, VA (Vertical Alignment) mode liquid crystal displays, MVA (Multi-domain Vertical Alignment) mode liquid crystal displays, ECB (Electrically Controlled Birefringence) mode displays, and the like are known.

Moreover, in horizontal electric field mode liquid crystal displays, an electric field in a substantially horizontal direction (in an in-plane direction of a laminate plane) is applied to liquid crystal molecules by a pair of mutually insulated electrodes on an inner surface of one of a pair of substrates arranged with a liquid crystal layer in between. As the horizontal electric field mode liquid crystal displays, IPS (In-Plane Switching) mode liquid crystal displays in which a pair of electrodes do not overlap each other in a plan view and FFS (Fringe Field Switching) mode liquid crystal displays in which a pair of electrodes overlap each other in a plan view are known.

In these liquid crystal displays, the direction of a director aligned in a predetermined direction of the liquid crystal layer is changed by an electric field to adjust a light transmission amount, thereby displaying an image. An operation principle of such a liquid crystal display in related art will be described below referring to FIG. 22.

It is to be noted that a part (A) in FIG. 22 is a schematic sectional view of a vertical electric field mode liquid crystal display in related art. The liquid crystal display illustrated in the part (A) in FIG. 22 uses, as an optical device, a change in an optical phase difference caused by application of an external electric field (a voltage) to a liquid crystal layer. A part (B) in FIG. 22 is a diagram illustrating a light transmission state in the liquid crystal display illustrated in the part (A) in FIG. 22. Parts (C) and (D) in FIG. 22 illustrate examples of an alignment state of a director in a nematic liquid crystal layer having positive dielectric constant anisotropy. The part (C) in FIG. 22 illustrates an example of an alignment state of the director under no voltage application. The part (D) in FIG. 22 illustrates an example of an alignment state of the director under voltage application. Most of liquid crystal displays in related art perform display by changing alignment of a director of a liquid crystal such as a nematic liquid crystal at lower than a nematic-isotropic phase transition temperature (TNI).

As illustrated in the part (A) in FIG. 22, in a liquid crystal display 200 in related art, a liquid crystal layer 230 is sandwiched between an array substrate 210 and a color filter substrate 220. Transparent electrodes 240 and 250 are formed on surfaces located closer to the liquid crystal layer 230 of the array substrate 210 and the color filter substrate 220, respectively. Moreover, polarizing plates 260 and 270 are disposed on outer surfaces (surfaces located farther from the liquid crystal layer 230) of the array substrate 210 and the color filter substrate 220, respectively. As illustrated in the part (B) in FIG. 22, light incident from a backlight 280 to the polarizing plate 260 on the array substrate 210 is converted into linearly polarized light, and a phase difference is given to the linearly polarized light while the linearly polarized light passes through the liquid crystal layer 230. Only a component parallel to a transmission axis of the polarizing plate 270 on the color filter substrate 220 of the light provided with the phase difference passes through the polarizing plate 270, and light having passed through the polarizing plate 270 is visually perceived by a viewer (not illustrated).

For example, as illustrated in the part (C) in FIG. 22, when an electric field is not applied, the director in the liquid crystal layer 230 is aligned in a horizontal direction by actions of the alignment films 310 and 320 formed on the surfaces of the transparent electrodes 240 and 250, respectively. Moreover, for example, as illustrated in the part (D) in FIG. 22, when an electric field is applied, the director in the liquid crystal layer 230 is aligned in a vertical direction by an action of the electric field. As described above, the alignment state of the director in the liquid crystal layer 230 is changed with an electric field application state, thereby changing a phase of light passing through the liquid crystal layer 230. Therefore, in the liquid crystal display 200 in related art, the light transmission amount is adjusted by an interaction between the electric field generated by the pair of transparent electrodes 240 and 250 and a transmission axis of the polarizing plate 270, thereby displaying a predetermined image.

It is to be noted that the horizontal electric field mode liquid crystal display includes a pair of electrodes located closer to the array substrate; however, the horizontal electric field mode liquid crystal display is in common with the above-described vertical electric field mode liquid crystal display in that the light transmission amount is adjusted by an interaction between an electric field generated by the pair of electrodes and a transmission axis of a light-emission side polarizing plate, thereby displaying a predetermined image.

SUMMARY

In the above-described liquid crystal displays, a further improvement in response speed and contrast is desired (refer to Japanese Unexamined Patent Application Publication Nos. H11-183937, 2001-265298, and 2007-323046). However, in liquid crystal displays in related art, a temperature region where faster response and higher contrast are obtainable is narrow; therefore, the liquid crystal displays have an issue that when temperatures thereof are out of the temperature region, response speed and contrast are reduced.

It is desirable to provide a liquid crystal display panel capable of expanding a temperature region where fast response and high contrast are obtainable, and a liquid crystal display including the liquid crystal display panel. Moreover, it is desirable to provide an electronic unit including the above-described liquid crystal display as a display section.

According to an embodiment of the technology, there is provided a liquid crystal display panel including: a liquid crystal layer including a liquid crystal material with positive dielectric constant anisotropy; a vertical alignment film being in contact with the liquid crystal layer; a first substrate and a second substrate disposed to face each other with the liquid crystal layer in between; and an electrode disposed on a surface of one or both of the first substrate and the second substrate and generating, in the liquid crystal layer, an electric field in a direction orthogonal to or intersecting with a normal to the first substrate.

According to an embodiment of the technology, there is provided a liquid crystal display including a liquid crystal display panel, and a drive circuit driving the liquid crystal display panel, the liquid crystal display panel including: a liquid crystal layer including a liquid crystal material with positive dielectric constant anisotropy; a vertical alignment film being in contact with the liquid crystal layer; a first substrate and a second substrate disposed to face each other with the liquid crystal layer in between; and an electrode disposed on a surface of one or both of the first substrate and the second substrate and generating, in the liquid crystal layer, an electric field in a direction orthogonal to or intersecting with a normal to the first substrate.

According to an embodiment of the technology, there is provided an electronic unit including a liquid crystal display as a display section, the liquid crystal display including a liquid crystal display panel, and a drive circuit driving the liquid crystal display panel, the liquid crystal display panel including: a liquid crystal layer including a liquid crystal material with positive dielectric constant anisotropy; a vertical alignment film being in contact with the liquid crystal layer; a first substrate and a second substrate disposed to face each other with the liquid crystal layer in between; and an electrode disposed on a surface of one or both of the first substrate and the second substrate and generating, in the liquid crystal layer, an electric field in a direction orthogonal to or intersecting with a normal to the first substrate.

In the liquid crystal display panel, the liquid crystal display, and the electronic unit according to the embodiment of the technology, by application of a voltage to the electrode, an electric field mainly in a direction orthogonal to or intersecting with the normal to the first substrate is generated in the liquid crystal layer mainly including the liquid crystal material with positive dielectric constant anisotropy and being in contact with the vertical alignment film. At this time, when a temperature of the liquid crystal layer falls within a nematic phase temperature region, a predetermined voltage is applied to the electrode to change a direction of a director of the liquid crystal layer to a direction following the electric field, and when the voltage applied to the electrode is removed, the direction of the director of the liquid crystal layer is returned to an original direction. Moreover, when the temperature of the liquid crystal layer falls within an isotropic phase temperature region, a predetermined voltage is applied to the electrode to cause phase transition from a liquid state (an isotropic phase) to a liquid crystal state (a nematic phase) in the liquid crystal layer, and when the voltage applied to the electrode is removed, the liquid crystal layer is returned to the original liquid state (the isotropic phase). As described above, in the embodiment of the technology, a change in light transmittance is allowed to be caused not only in the nematic phase temperature region but also in the isotropic phase temperature region. In this case, nematic phase induction/dissipation speed in the isotropic phase temperature region is extensively higher than director realignment speed in the nematic phase temperature region. Therefore, high-speed response is obtained with use of a change in light transmittance based on induction and dissipation of the nematic phase in the isotropic phase temperature region. Moreover, when the temperature of the liquid crystal layer falls within the isotropic phase temperature region, the director of the liquid crystal layer is dissipated, and birefringence is not generated in the liquid crystal layer. Therefore, even if a foreign substance enters into the liquid crystal layer, light leakage due to disclination of the liquid crystal layer is not caused in a region around the foreign substance of the liquid crystal layer. Accordingly, even if a change in the light transmittance based on the induction and dissipation of the nematic phase in the isotropic phase temperature region is used, deep black luminance is obtained.

In the embodiment of the technology, for example, the above-described predetermined voltage may correspond to a voltage (a first voltage) at which birefringence of the liquid crystal layer, when the temperature of the liquid crystal layer falls within the isotropic phase temperature region, is equal to or substantially equal to that when the temperature of the liquid crystal layer falls within the nematic phase temperature region. Moreover, in the embodiment of the technology, the liquid crystal display panel may include a pair of polarizing plates disposed to face each other with the first substrate and the second substrate in between. In this case, when the pair of polarizing plates satisfy a crossed nicols condition, and is in a state where their absorption axes are different by about 45 degrees from a direction of the electric field, for example, the above-described predetermined voltage may correspond to or may be higher than a voltage (a third voltage) at which light transmittance of the liquid crystal display panel is maximized when the temperature of the liquid crystal layer falls within the isotropic phase temperature region. Moreover, when the pair of polarizing plates satisfy a parallel nicols condition and are in a state where their absorption axes are different by 90 degrees from the direction of the electric field, the above-described predetermined voltage may correspond to or may be higher than a voltage (a fifth voltage) at which light transmittance of the liquid crystal display panel is minimized when the temperature of the liquid crystal layer falls within the isotropic phase temperature region.

Further, in the embodiment of the technology, the electrode may be driven by the drive circuit with use of two values including the above-described first voltage, the above-described third voltage, or the above-described fifth voltage and a voltage different therefrom.

The liquid crystal display panel, the liquid crystal display, and the electronic unit according to the embodiment of the technology are allowed to use not only the nematic phase temperature region but also the isotropic phase temperature region; therefore, a temperature region where high-speed response and high contrast are obtainable is allowed to be expanded.

Moreover, in the embodiment of the technology, even if the temperature of the liquid crystal layer falls within any of the nematic phase temperature region and the isotropic phase temperature region, the first voltage, the third voltage, or the fifth voltage is applied to the electrode to adjust the light transmittance of the display panel to be substantially equal. Therefore, irrespective of the temperature of the liquid crystal layer, the display panel is allowed to be driven under the same drive condition. In other words, in the embodiment of the technology, when a voltage higher than a normal voltage is applied to the electrode, a temperature region where high-speed response and high contrast are obtainable is allowed to be expanded without a temperature sensor. As a result, a configuration of the liquid crystal display is allowed to be simplified.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 3A-3D illustrate an example of a state of a liquid crystal layer in FIG. 1.

FIGS. 15A-15D illustrate an example of a state of a liquid crystal layer in FIG. 13.

DETAILED DESCRIPTION OF THE PREFERRED EMBODIMENTS

Preferred embodiments of the present technology will be described in detail below referring to the accompanying drawings. It is to be noted that description will be given in the following order.

1. First Embodiment

Liquid Crystal Display

Figure 1:
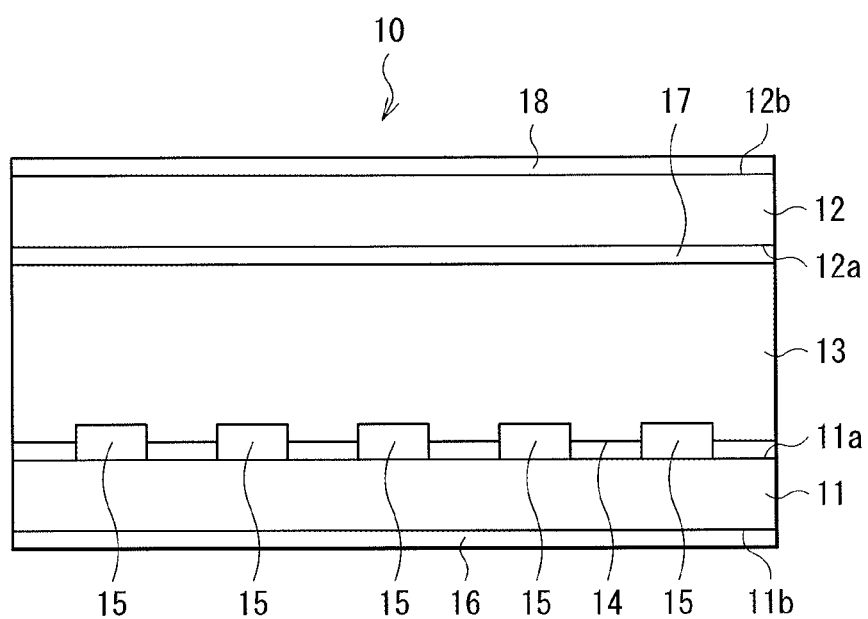
FIG. 1 is a diagram illustrating an example of a configuration of a liquid crystal display panel according to a first embodiment.

An example in which display is performed by vertical alignment-horizontal electric field control
An example in which a temperature determination circuit is included 2. Second Embodiment Liquid Crystal Display An example in which display is performed by vertical alignment-horizontal electric field control
An example in which a temperature control circuit is included 3. Third Embodiment Liquid Crystal Display An example in which display is performed by vertical alignment-horizontal electric field control
An example in which temperature detection is not performed 4. Modifications of Third Embodiment Liquid Crystal Display An example in which display is performed by vertical alignment-horizontal electric field control
An example in which a temperature determination circuit is included 5. Fourth Embodiment Liquid Crystal Display An example in which display is performed by horizontal alignment-vertical electric field control
An example in which temperature detection is not performed 6. Modifications of Fourth Embodiment Liquid Crystal Display An example in which display is performed by horizontal alignment-vertical electric field control
An example in which a temperature determination circuit is included 7. Application Example An example in which any of the liquid crystal displays according to the above-described respective embodiments is used as a display section 8. Modification An example in which polarizing plates satisfy a parallel nicols condition 1. First Embodiment Configuration FIG. 1 is a sectional view illustrating an example of a configuration of a liquid crystal display panel 10 according to a first embodiment.

The liquid crystal display panel 10 includes two transparent substrates 11 and 12 facing each other and having insulation, and a liquid crystal layer 13 sandwiched between the transparent substrates 11 and 12. The transparent substrates 11 and 12 are made of, for example, glass.

The liquid crystal display panel 10 includes an alignment film 14, being in contact with the liquid crystal layer 13, on a surface 11a facing the transparent substrate 12 of the transparent substrate 11. The alignment film 14 is a vertical alignment film aligning the orientation of the liquid crystal layer 13 in a vertical direction. The vertical alignment film is configured of, for example, a polyimide film or an obliquely evaporated film. It is to be noted that the obliquely evaporated film is an inorganic alignment film, and is configured by including, for example, SiOx. The liquid crystal display panel 10 further includes a plurality of electrodes 15 on the surface 11a of the transparent substrate 11. When a voltage is supplied to the plurality of electrodes 15, the electrodes 15 generate, in the liquid crystal layer 13, an electric field in a direction orthogonal to or intersecting with a normal to the transparent substrate 11 (that is, a horizontal direction) to change an orientation direction of the liquid crystal layer 13. The electrodes 15 each have, for example, a strip-like shape extending in one direction in a plane parallel to the surface 11a of the transparent substrate 11, and a potential difference is generated between two adjacent electrodes 15, thereby enabling to generate an electric field mainly in the horizontal direction in the liquid crystal layer 13. The liquid crystal display panel 10 includes a polarizing plate 16 on a surface 11b opposite to the surface 11a of the transparent substrate 11.

The liquid crystal display panel 10 includes an alignment film 17, being in contact with the liquid crystal layer 13, on a surface 12a facing the transparent substrate 11 of the transparent substrate 12. The alignment film 17 is a vertical alignment film aligning the orientation of the liquid crystal layer 13 in the vertical direction. The vertical alignment film is configured of, for example, a polyimide film, or an obliquely evaporated film. It is to be noted that the obliquely evaporated film is an inorganic alignment film, and is configured by including, for example, SiOx. The liquid crystal display panel 10 includes a polarizing plate 18 on a surface 12b opposite to the surface 12a of the transparent substrate 12. In this case, the polarizing plate 16 and the polarizing plate 18 satisfy a crossed nicols condition, and are in a state where their absorption axes are different by about 45 degrees from the electrodes 15.

As described above, the liquid crystal display panel 10 is configured to be of a VA-IPS mode in which the VA-mode liquid crystal layer 13 is driven by a horizontal electric field. In this case, a distance between the transparent substrate 11 and the transparent substrate 12 is, for example, 3 μm. A distance between two adjacent electrodes 15 is, for example, 10 μm. The width of the electrode 15 is, for example, 5 μm. The height of the electrode 15 is, for example, 0.5 μm.

The liquid crystal layer 13 is made of a nematic liquid crystal having positive dielectric constant anisotropy. The liquid crystal layer 13 has a predetermined phase transition temperature (TNI), and when the temperature of the liquid crystal layer 13 is lower than the phase transition temperature, the liquid crystal layer 13 is in a nematic phase, and when the temperature of the liquid crystal layer 13 is equal to or higher than the phase transition temperature, the liquid crystal layer 13 is in an isotropic phase which is a liquid phase. The liquid crystal layer 13 includes, for example, 4-cyano-4'pentylbiphenyl (hereinafter referred to as "5CB"). The phase transition temperature of "5CB" is 35 degrees Celsius. The liquid crystal layer 13 may be made of a liquid crystal material other than 5CB.

In an isotropic-phase temperature region, the liquid crystal layer 13 is in the isotropic phase; therefore, light passing through the liquid crystal layer 13 is not affected. As the polarizing plates 16 and 18 are arranged in a crossed nicols state, light passing through one polarizing plate 16 to be converted into linearly polarized light is not allowed to pass through the other polarizing plate 18.

However, when a voltage is supplied to the electrodes 15 to apply an electric field to the liquid crystal layer 13, the nematic phase is induced. As a phase of light passing through the nematic phase is changed by the electro-optical Kerr effect, a phase of light passing through one polarizing plate 16 to be converted into linearly polarized light is changed while the light passes through the nematic phase, thereby allowing the light to pass through the other polarizing plate 18. Consequently, the liquid crystal display panel 10 is of a normally black type.

Figure 2:
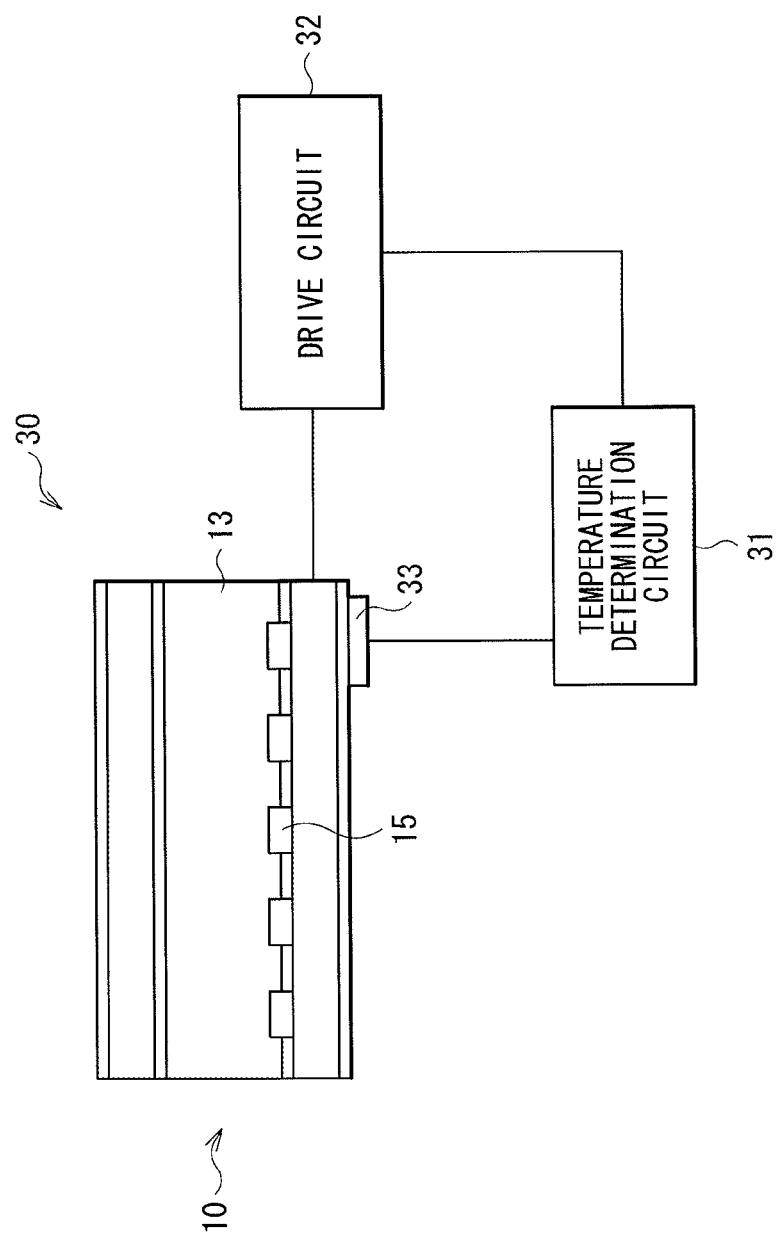
FIG. 2 is a diagram illustrating an example of a configuration of a liquid crystal display according to the first embodiment.

Next, a liquid crystal display using the liquid crystal display panel 10 will be described below. FIG. 2 is a diagram illustrating an example of a liquid crystal display 30 according to the first embodiment. The liquid crystal display 30 includes the liquid crystal display panel 10, a temperature determination circuit 31, a drive circuit 32, a temperature sensor 33, and a backlight (not illustrated).

The backlight illuminates the liquid crystal display panel 10 from a back (the polarizing plate 11) side of the liquid crystal display panel 10. The backlight is a direct type light source in which a plurality of optical sheets are disposed on a plurality of linear light sources arranged in parallel with one another. It is to be noted that the backlight may be, for example, a side-edge type light source in which a linear light source is disposed on an end of a light guide plate and a plurality of optical sheets are disposed on a top surface of the light guide plate.

The temperature sensor 33 detects the temperature of the liquid crystal layer 13, and outputs a detection signal to the temperature determination circuit 31. The temperature determination circuit 31 determines, based on the received detection signal, whether the temperature of the liquid crystal layer 13 is lower than the phase transition temperature, or equal to or higher than the phase transition temperature. Moreover, the temperature determination circuit 31 outputs a determination result to the drive circuit 32.

The drive circuit 32 supplies a predetermined voltage to the electrodes 15 of the liquid crystal display panel 10 based on the received determination result. In other words, in the case where the temperature of the liquid crystal layer 13 is lower than the phase transition temperature, that is, in the case where the liquid crystal layer 13 is in the nematic phase, the drive circuit 32 supplies, to the electrodes 15, a voltage causing a change in light transmittance based on a change in the direction of a director of the liquid crystal layer 13.

Moreover, in the case where the temperature of the liquid crystal layer 13 is equal to or higher than the phase transition temperature, that is, in the case where the liquid crystal layer 13 is in the isotropic phase, the drive circuit 32 supplies, to the electrodes 15, a voltage causing a change in light transmittance based on a nematic-phase induction/dissipation phenomenon.

In this case, the voltage (for example, 100 V) causing a change in light transmittance based on the nematic-phase induction/dissipation phenomenon is higher than the voltage (for example, 10 V) causing a change in light transmittance based on a change in the direction of the director.

Thus, when the drive circuit 32 supplies a predetermined voltage to the electrodes 15 of the liquid crystal display panel 10 based on the received determination result, the liquid crystal display 30 is allowed to be driven in both of the nematic phase temperature region and the isotropic phase temperature region.

[Operation]

Figure 4:
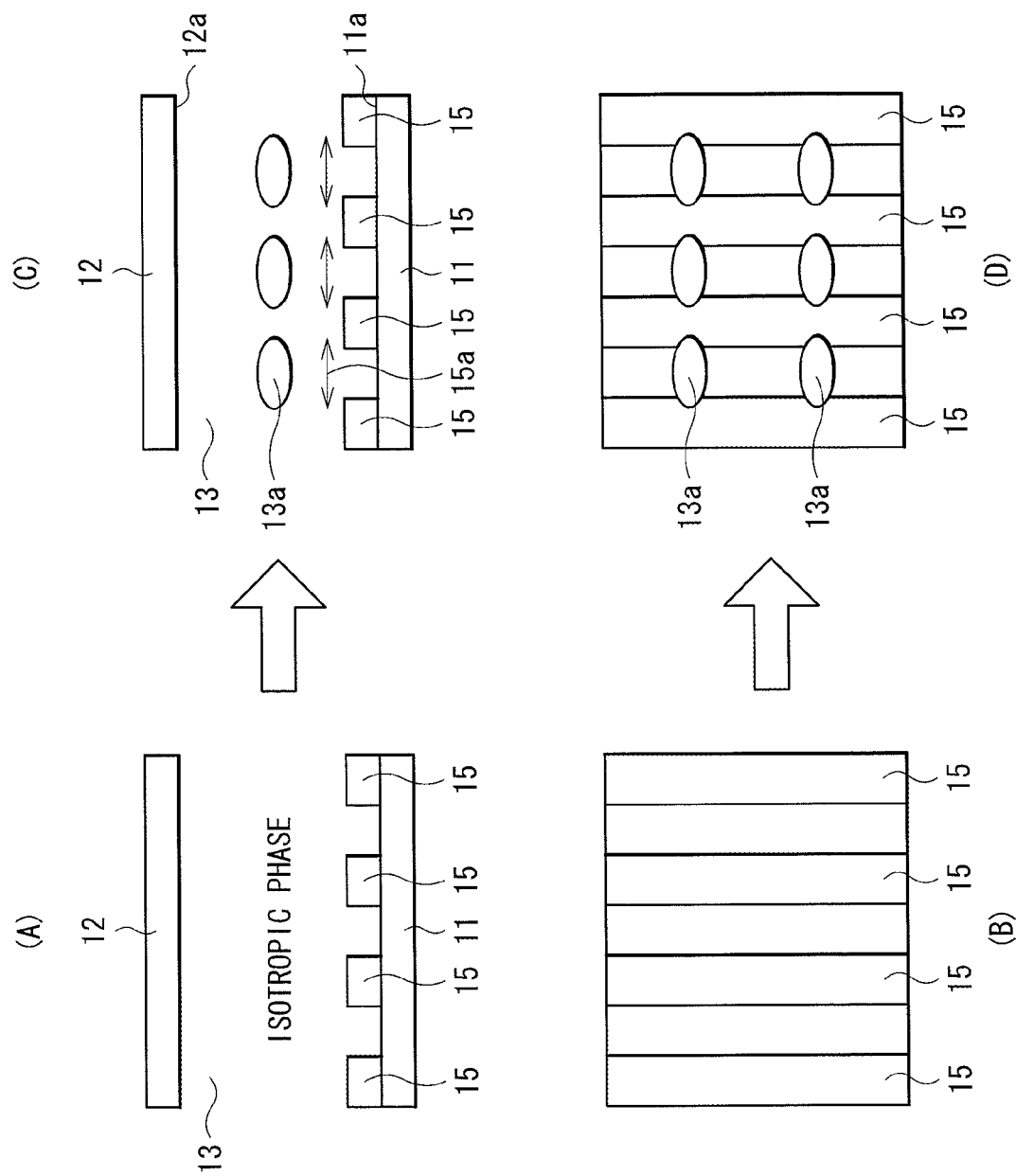
FIGS. 4A-4D illustrate another example of the state of the liquid crystal layer in FIG. 1.

Next, a state of the liquid crystal layer 13 of the liquid crystal display panel 10 will be described below. Parts (A) to (D) in FIG. 3 and parts (A) to (D) in FIG. 4 are diagrams illustrating examples of the state of the liquid crystal layer 13 according to the first embodiment. FIG. 3 illustrates the case where the temperature of the liquid crystal layer 13 falls within the nematic phase temperature region. The parts (A) and (B) in FIG. 3 illustrate the case where a voltage is not supplied to the electrodes 15, and the parts (C) and (D) in FIG. 3 illustrate the case where the voltage is supplied to the electrodes 15. It is to be noted that the parts (A) and (C) in FIG. 3 are sectional views, and the parts (B) and (D) in FIG. 3 are plan views.

As illustrated in the parts (A) and (B) in FIG. 3, in the case where a voltage is not supplied to the electrodes 15, that is, in the case where an electric field is not applied to the liquid crystal layer 13, a director 13a of the liquid crystal layer 13 is aligned in the vertical direction. In other words, a long-axis direction of the director 13a is aligned in a direction orthogonal to the surface 11a of the transparent substrate 11 and the surface 12a of the transparent substrate 12.

As illustrated in the parts (C) and (D) in FIG. 3, in the case where a voltage is supplied to the electrodes 15, that is, in the case where a horizontal electric field 15a is applied to the liquid crystal layer 13, the director 13a of the liquid crystal layer 13 is aligned in the horizontal direction. In other words, the long-axis direction of the director 13a is aligned in a direction parallel to the surface 11a of the transparent substrate 11 and the surface 12a of the transparent substrate 12.

The parts (A) to (D) in FIG. 4 are diagrams in the case where the temperature of the liquid crystal layer 13 falls within the isotropic phase temperature region. The parts (A) and (B) in FIG. 4 illustrate the case where a voltage is not supplied to the electrodes 15. The parts (C) and (D) in FIG. 4 illustrate the case where a voltage is supplied to the electrodes 15. It is to be noted that the parts (A) and (C) in FIG. 4 are sectional views and the parts (B) and (D) in FIG. 4 are plan views.

As illustrated in the parts (A) and (B) in FIG. 4, in the case where a voltage is not supplied to the electrodes 15, that is, in the case where an electric field is not applied to the liquid crystal layer 13, the liquid crystal layer 13 is in the isotropic phase. In other words, in the liquid crystal layer 13, the nematic phase is dissipated.

As illustrated in the parts (C) and (D) in FIG. 4, in the case where a voltage is supplied to the electrodes 15, that is, in the case where the horizontal electric field 15a is applied to the liquid crystal layer 13, the nematic phase is induced in the liquid crystal layer 13. In this case, the director 13a of the liquid crystal layer 13 is aligned in the horizontal direction. In other words, the long-axis direction of the director 13a is aligned in a direction parallel to the surface 11a of the transparent substrate 11 and the surface 12a of the transparent substrate 12.

Figure 5:
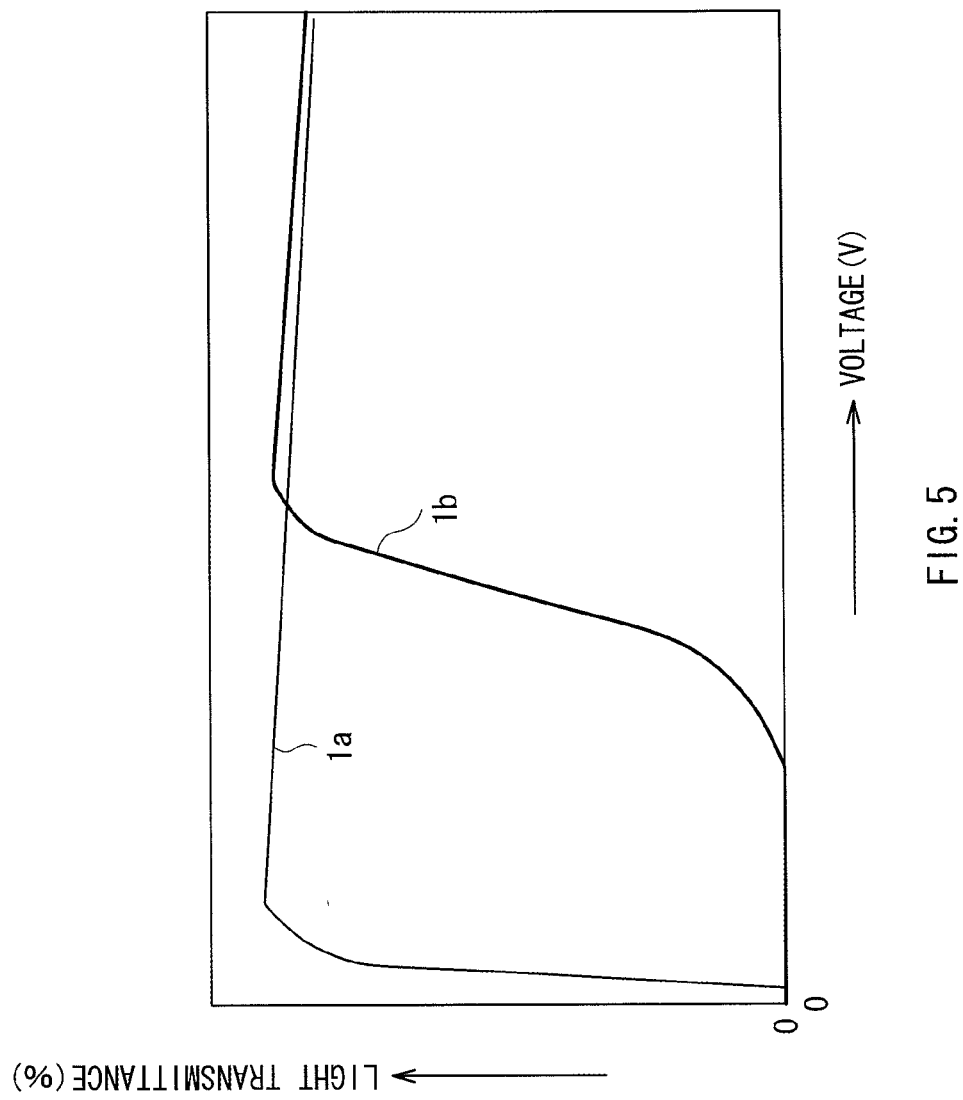
FIG. 5 is a diagram illustrating an example of light transmittance of the liquid crystal display panel in FIG. 1.

Next, light transmittance of the liquid crystal display panel 10 will be described below. FIG. 5 is a diagram illustrating an example of light transmittance of the liquid crystal display panel 10. A horizontal axis and a vertical axis in FIG. 5 represent a voltage (V) supplied to the electrodes 15 and light transmittance (%) of the liquid crystal display panel 10, respectively. A characteristic 1a represents a light transmittance characteristic in the nematic phase temperature region, and a characteristic 1b represents a light transmittance characteristic in the isotropic phase temperature region.

As illustrated by the characteristics 1a and 1b, upper-limit light transmittance in the nematic phase temperature region and upper-limit light transmittance in the isotropic phase temperature region are substantially equal to each other. As a result, in the liquid crystal display 30, switching between white and black is allowed to be performed without consideration of a relationship between the crossed nicols state of the polarizing plates 16 and 18 of the liquid crystal display panel 10 and an orientation axis of the liquid crystal layer 13.

[Effects]

Next, effects of the liquid crystal display 30 will be described with use of a comparative example (1). The comparative example (1) is a liquid crystal display of a type in which an orientation of a liquid crystal layer of a liquid crystal display panel is aligned in a parallel direction, unlike the liquid crystal display panel 10.

Figure 6A:
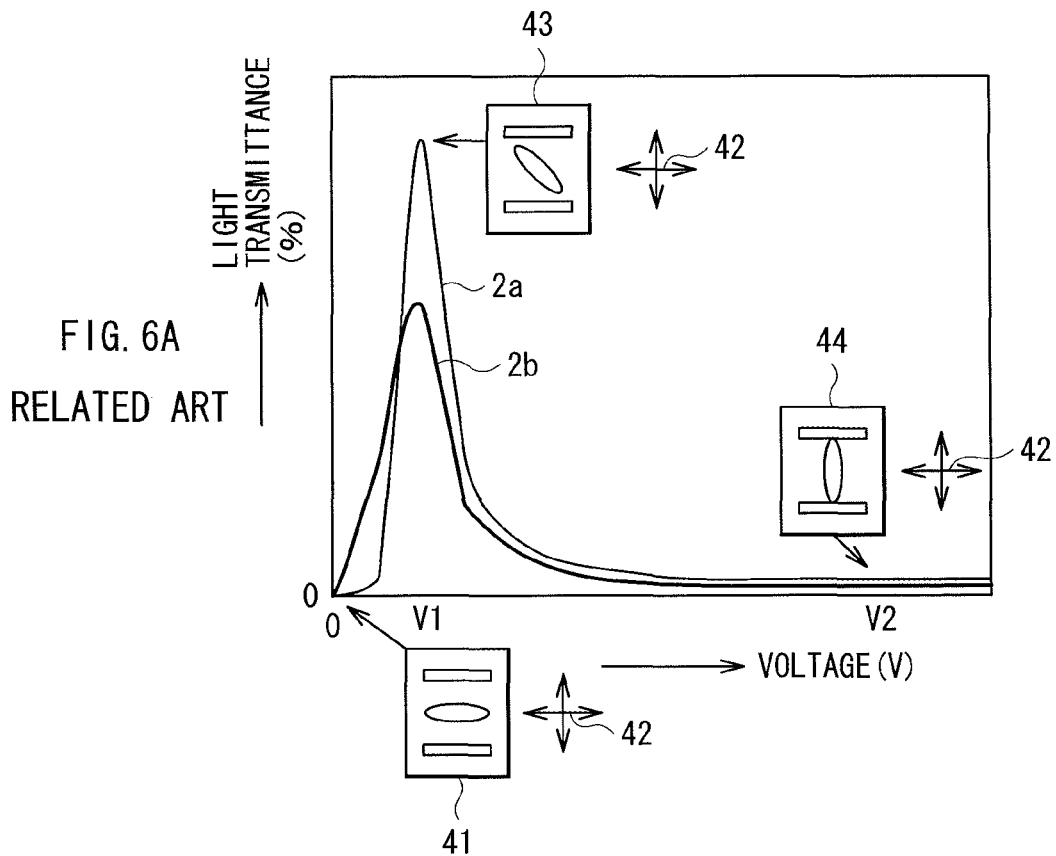
FIGS. 6A and 6B are diagrams illustrating examples of light transmittance of a comparative example (1).
Figure 6B:
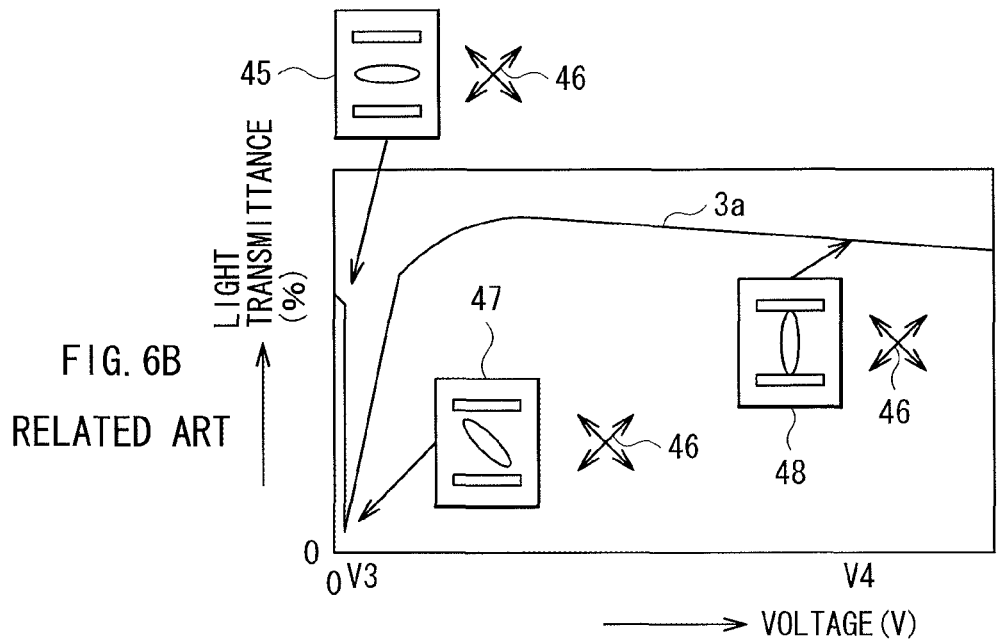

FIGS. 6A and 6B are diagrams illustrating examples of light transmittance of the comparative example (1). A horizontal axis and a vertical axis in each of FIGS. 6A and 6B represent a voltage (V) supplied to an electrode of the liquid crystal display panel, and light transmittance (%) of the liquid crystal display panel, respectively. The example illustrated in FIG. 6A will be described first.

Characteristics 2a and 2b represent light transmittance characteristics at predetermined different temperatures. As illustrated by the characteristics 2a and 2b, an orientation 41 of the liquid crystal layer coincides with a crossed nicols direction 42 around a voltage of 0 V; therefore, the transmittance is close to 0%. Around a voltage V1, an orientation 43 of the liquid crystal layer does not coincide with the crossed nicols direction 42, and the light transmittance is saturated at a high value. At this time, a saturation value of the light transmittance greatly differs between the characteristics 2a and 2b. An orientation 44 of the liquid crystal layer coincides with the crossed nicols direction 42 around a voltage V2 higher than V1; therefore, the light transmittance is close to 0%.

Next, the example illustrated in FIG. 6B will be described below. In the example illustrated in FIG. 6B, the crossed nicols direction is different from that in the example illustrated in FIG. 6A. A characteristic 3a represents a light transmittance characteristic at a predetermined temperature. As illustrated by the characteristic 3a, around a voltage of 0 V, an orientation 45 of the liquid crystal layer does not coincide with a crossed nicols direction 46, and the light transmittance has a value close to a peak value. Around a voltage V3, an orientation 47 of the liquid crystal layer coincides with the crossed nicols direction 46, and the light transmittance is close to 0%. Around a voltage V4 higher than V3, an orientation 48 of the liquid crystal layer does not coincide with the crossed nicols direction 46, and the light transmittance has a peak value.

Thus, in the case where the orientation of the liquid crystal layer is aligned in the parallel direction, the light transmittance has the above-described characteristic; therefore, in the case where both of the nematic phase temperature region and the isotropic phase temperature region are used, it is necessary to devise a relationship between the orientation direction of the liquid crystal layer and the crossed nicols direction.

Figure 7:
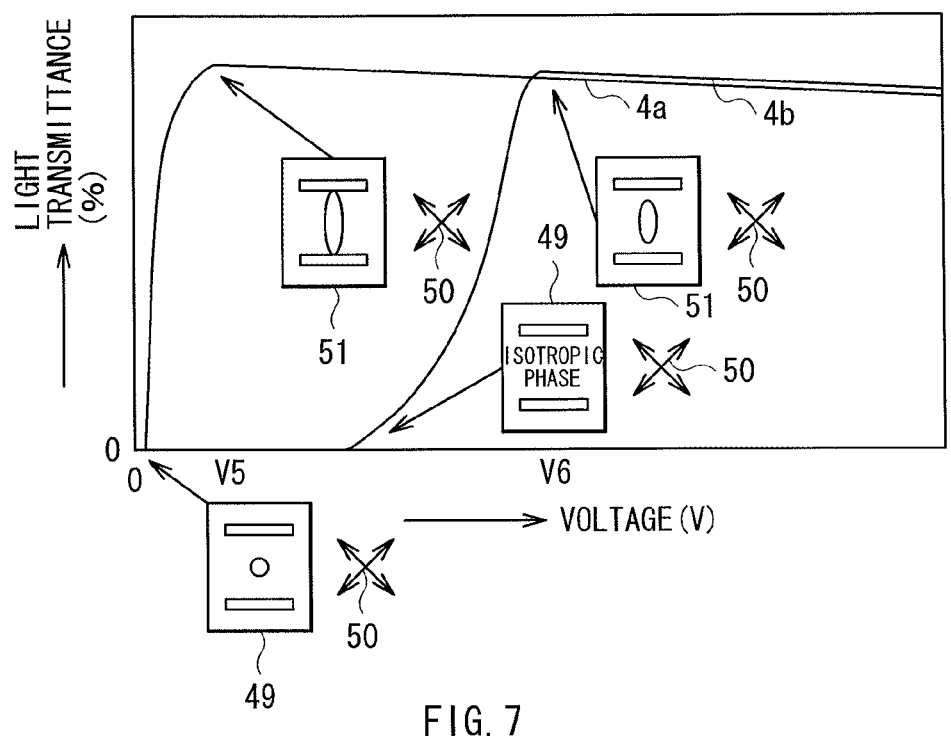
FIG. 7 is a diagram illustrating an example of light transmittance of a liquid crystal display of a type in which an orientation of a liquid crystal layer is aligned in a vertical direction.

Next, a liquid crystal display in which an orientation of a liquid crystal of a liquid crystal display panel is aligned in the vertical direction as in the case of the liquid crystal display panel 10 will be described below. FIG. 7 is a diagram illustrating an example of light transmittance of a liquid crystal display in which an orientation of a liquid crystal is aligned in the vertical direction. A horizontal axis and a vertical axis in FIG. 7 represent a voltage (V) supplied to an electrode of the liquid crystal display panel and light transmittance (%) of the liquid crystal display panel, respectively.

Characteristics 4a and 4b represent light transmittance characteristics at predetermined different temperatures. It is to be noted that the temperature in the characteristic 4a falls within the nematic phase temperature region, and the temperature in the characteristic 4b falls within the isotropic phase temperature region. At the temperature in the characteristic 4a, around a voltage of 0 V, an orientation 49 of the liquid crystal layer is aligned in the vertical direction, and the light transmittance is close to 0%. On the other hand, at the temperature in the characteristic 4b, around a voltage of 0 V, the liquid crystal layer becomes an isotropic phase layer, and the light transmittance is close to 0%. At the temperature in the characteristic 4a, around a voltage V5, an orientation 51 of the liquid crystal layer does not coincide with a crossed nicols direction 50, and the light transmittance has a peak value. At a voltage higher than V5, the light transmittance is maintained at the peak value. On the other hand, at the temperature in the characteristic 4b, around a voltage V6, the nematic phase is induced in the liquid crystal layer, and the orientation 51 of the liquid crystal layer does not coincide with the crossed nicols direction 50, and the light transmittance has a peak value. In this case, in temperature conditions of both of the characteristics 4a and 4b, the peak values of the light transmittance in the characteristics 4a and 4b are very close to each other.

Thus, in the case where the orientation of the liquid crystal layer is aligned in the vertical direction, the light transmittance has the above-described characteristics; therefore, in the case where both of the nematic phase temperature region and the isotropic phase temperature region are used, it is not necessary to consider a relationship between the orientation direction of the liquid crystal layer and the crossed nicols direction. Therefore, the number of steps including rubbingless is allowed to be reduced, and an improvement in yields is allowed to be expected.

In other words, in the case where the orientation of the liquid crystal layer is aligned in the vertical direction, an optical characteristic in the nematic phase temperature region and an optical characteristic in the isotropic phase temperature region are similar to each other. Therefore, driving conditions for ideal black display and ideal white display are easily shared between the nematic phase temperature region and the isotropic phase temperature region, and a floating black phenomenon is less likely to occur, thereby enabling to achieve higher contrast.

In other words, in the liquid crystal display 30, the orientation of the liquid crystal layer 13 is aligned in the vertical direction; therefore, higher contrast is allowed to be achieved, and an improvement in yields is also allowed to be expected.

Next, effects of the liquid crystal display 30 will be described with use of a comparative example (2).

Figure 8A:
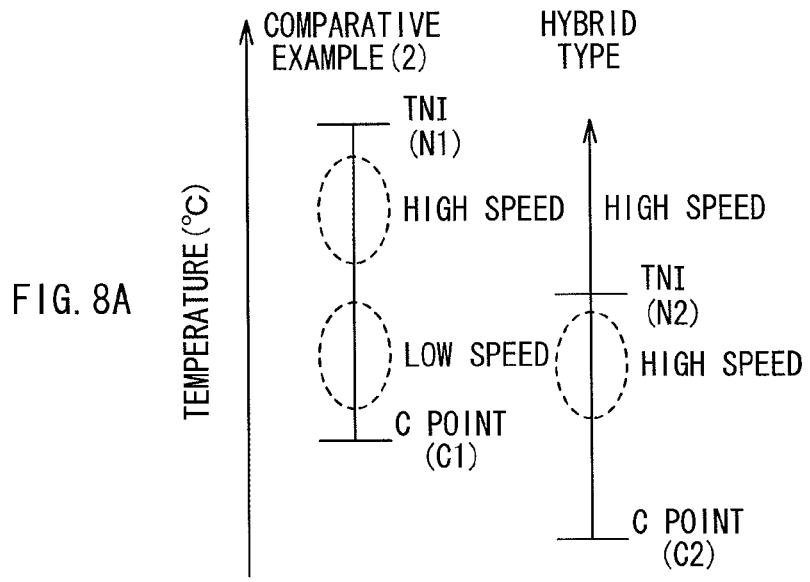
FIGS. 8A and 8B are diagrams illustrating an example of response speed.
Figure 8B:
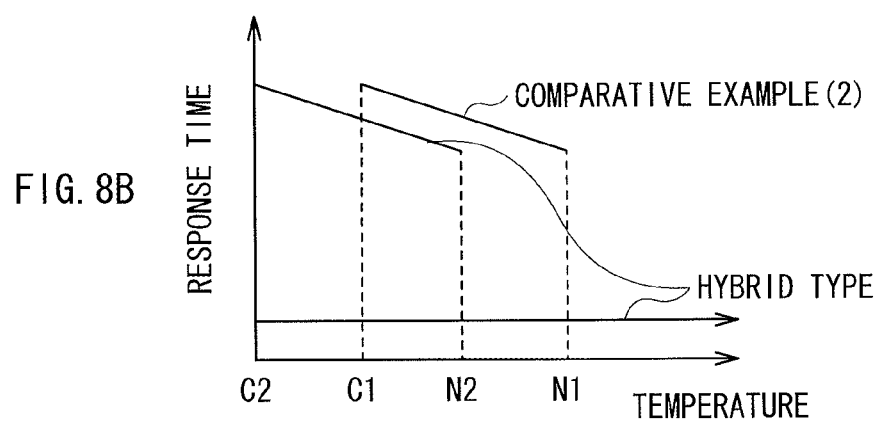

FIGS. 8A and 8B are diagrams illustrating examples of response speed. The comparative example (2) is a liquid crystal display of a type in which only the nematic phase temperature region is used. A liquid crystal display of a type (referred to as "hybrid type") in which both of the nematic phase temperature region and the isotropic phase temperature region are used, such as the liquid crystal display 30, has higher response speed, compared to the comparative example (2).

In other words, the hybrid type liquid crystal display is allowed to achieve faster response by temperature dependence of viscosity in a liquid crystal layer whose temperature is lower than the phase transition temperature. FIGS. 8A and 8B are conceptual diagrams of phase transition temperatures ((TNI (N1, N2)) of the liquid crystal layers, used temperature ranges, and temperature dependence in response speed at this time in the hybrid type liquid crystal display and the comparative example (2). It is to be noted that C points (C1 and C2) represent crystal points.

In the case where an actual temperature T is lower than the phase transition temperature, and T1=TNI−T is established, the viscosity of the liquid crystal layer is increased with an increase in T1. A rise (Tr) and a decay (Td) of a response are represented by the following expressions.

$$Tr = \{\gamma \times d/\pi^2 \times Keff\}(V/Vth - 1)$$

$$Td = \gamma \times d/\pi^2 \times Keff$$

where γ is viscosity, d is cell thickness, V is voltage, Vth is threshold voltage, and Keff is elasticity.

In the above-described expressions, when γ is increased, response time is increased. In other words, it is clear that responsivity becomes slower. On the other hand, in the hybrid type liquid crystal display, an absolute value of the phase transition temperature is allowed to be reduced; therefore, even if the actual temperature is lower than the phase transition temperature, the hybrid type liquid crystal display is allowed to have faster responsivity than that in the comparative example (2).

In other words, as the liquid crystal display 30 uses both of the nematic phase temperature region and the isotropic phase temperature region, response speed is allowed to be improved. Moreover, with regard to higher contrast, in the hybrid type liquid crystal display, the liquid crystal layer does not generate birefringence in the isotropic phase temperature region, compared to the comparative example (2). Accordingly, for example, light leakage due to disclination of the liquid crystal layer around a projection or a depression formed by a foreign substance or the like does not occur, thereby obtaining relatively low black luminance. As a result, high contrast is exhibited.

Next, effects of the liquid crystal display 30 will be described with use of a comparative example (3). The comparative example (3) is a liquid crystal display of a type in which only the isotropic phase temperature region is used. In the case of the comparative example (3), as only the isotropic phase temperature region is used, a temperature range where display is allowed to be performed is narrow. In the hybrid type liquid crystal display such as the liquid crystal display 30, even at a temperature lower than the phase transition temperature, display is allowed to be performed; therefore, display is allowed to be performed in a wide temperature range.

As described above, in the liquid crystal display 30, an improvement in response speed and higher contrast are allowed to be achieved.

2. Second Embodiment

Next, another liquid crystal display using the liquid crystal display panel 10 in the first embodiment will be described below as a second embodiment.

Figure 9:
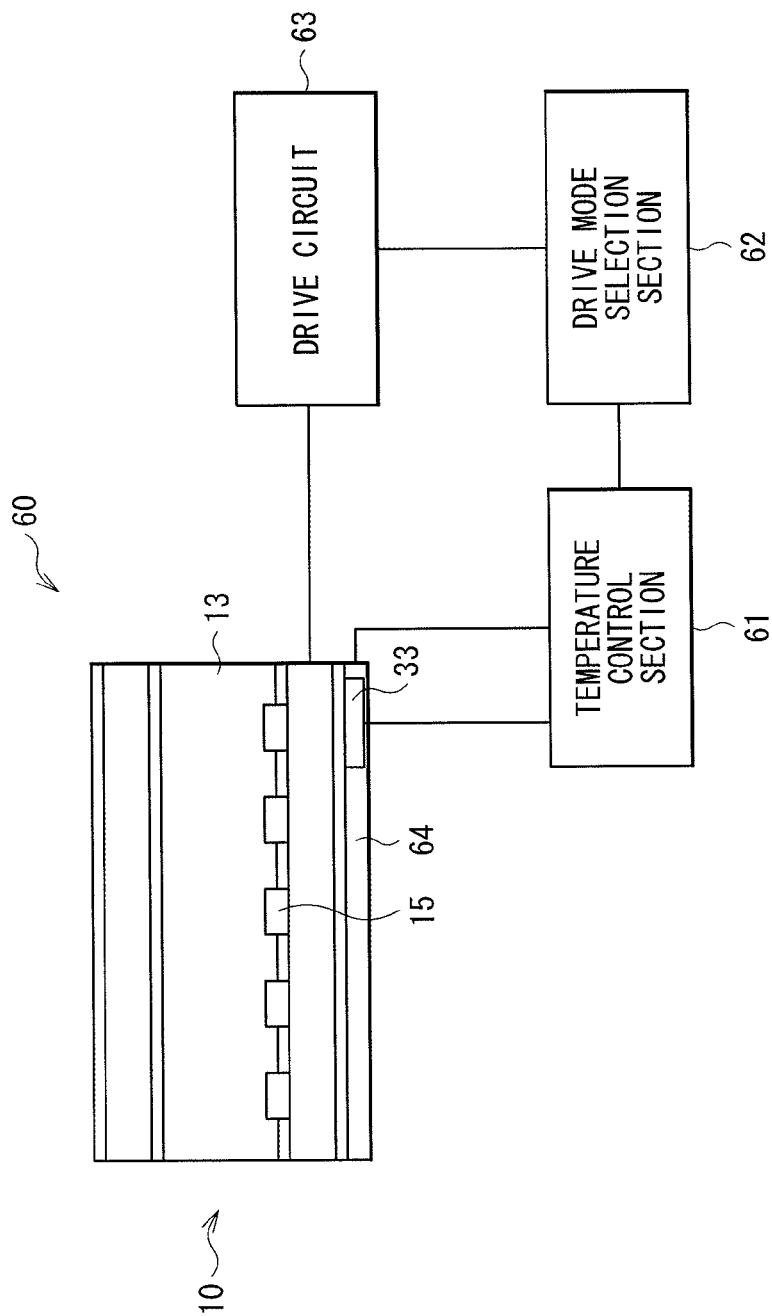
FIG. 9 is a diagram illustrating an example of a configuration of a liquid crystal display according to a second embodiment.

FIG. 9 is a diagram illustrating an example of a liquid crystal display 60 according to the second embodiment. The liquid crystal display 60 includes the liquid crystal display panel 10, a temperature control section 61, a drive mode selection section 62, and a drive circuit 63. The liquid crystal display 60 further includes the temperature sensor 33 and a Peltier device 64.

The Peltier device 64 is a device allowed to control one plane thereof to be switched to a heat generation state or heat absorption state by a direction of a flowing DC current. For example, the Peltier device 64 is disposed in contact with a back surface of a light guide plate of a side-lit type backlight light source (not illustrated).

The drive mode selection section 62 selects whether display is performed in the isotropic phase temperature region or in the nematic phase temperature region based on an external input. The temperature control section 61 adjusts the temperature of the liquid crystal layer 13 of the liquid crystal display panel 10 based on a selection result from the drive mode selection section 62. In other words, when the drive mode selection section 62 selects display in the isotropic phase temperature region, the temperature control section 61 controls the Peltier device 64 to adjust the temperature of the liquid crystal layer 13 to the isotropic phase temperature. The temperature sensor 33 is used to detect the temperature of the liquid crystal layer 13.

Moreover, in the case where the drive mode selection section 62 selects display in the nematic phase temperature region, the temperature control section 61 controls the Peltier device 64 to adjust the temperature of the liquid crystal layer 13 to the nematic phase temperature.

The drive circuit 63 supplies a predetermined voltage to the electrodes 15 of the liquid crystal display panel 10 based on the selection result from the drive mode selection section 62. In other words, when the drive mode selection section 62 selects display in the isotropic phase temperature region, the drive circuit 63 supplies, to the electrodes 15, a voltage causing a change in light transmittance based on the nematic-phase induction/dissipation phenomenon in the liquid crystal layer 13.

Moreover, when the drive mode selection section 62 selects display in the nematic phase temperature region, the drive circuit 63 supplies, to the electrodes 15, a voltage causing a change in light transmittance based on a change in the direction of the director of the liquid crystal layer 13.

Thus, when the drive circuit 63 supplies a predetermined voltage to the electrodes 15 of the liquid crystal display panel 10 based on the selection result from the drive mode selection section 62, the liquid crystal display 60 is allowed to select one of display in the nematic phase temperature region and display in the isotropic phase temperature region.

3. Third Embodiment

Configuration

Next, still another liquid crystal display using the liquid crystal display panel 10 in the first embodiment will be described below as a third embodiment.

Figure 10:
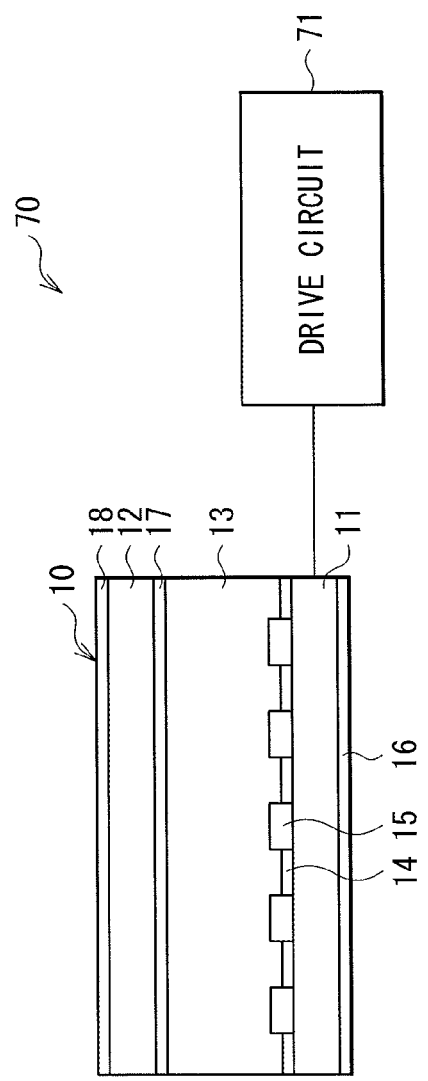
FIG. 10 is a diagram illustrating an example of a configuration of a liquid crystal display according to a third embodiment.

FIG. 10 illustrates an example of a liquid crystal display 70 according to the third embodiment. The liquid crystal display 70 includes the liquid crystal display panel 10, a drive circuit 71 driving the liquid crystal display panel 10, and a backlight (not illustrated) illuminating the liquid crystal display panel 10 from a back side of the liquid crystal display panel 10.

The drive circuit 71 applies a voltage within a predetermined range (hereinafter referred to as Vx for the sake of convenience) to the electrodes 15 irrespective of the temperature of the liquid crystal layer 13. More specifically, when the electrodes 15 each have, for example, a strip-like shape extending in one direction in a plane parallel to the surface 11a of the transparent substrate 11, the drive circuit 71 applies, to each of the electrodes 15, the voltage Vx causing a potential difference between two adjacent electrodes 15 to perform white display. Moreover, the drive circuit 71 applies a voltage (for example, 0 V or a voltage of approximately 0 V) different from Vx irrespective of the temperature of the liquid crystal layer 13 to perform black display.

Figure 11:
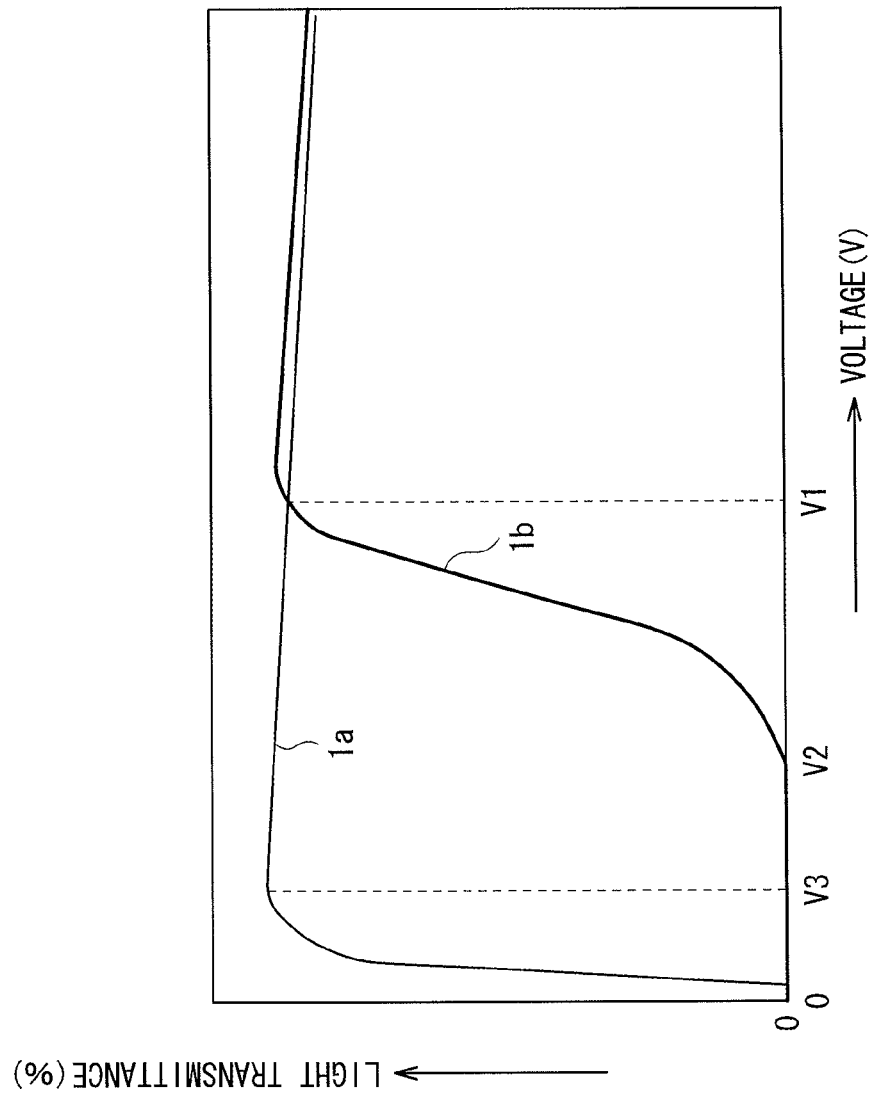
FIG. 11 is a diagram illustrating an example of light transmission of a liquid crystal display panel in FIG. 10.

In this case, Vx represents a voltage equal to or higher than a voltage (V1) at which the light transmittance of the liquid crystal display panel 10 is maximized when temperature of the liquid crystal layer 13 falls within the isotropic phase temperature region (or a minimum voltage within a voltage range where the light transmittance of the liquid crystal display panel 10 is saturated at a high value) (refer to FIG. 11), as well as a voltage equal to or lower than a maximum voltage within the voltage range where the light transmittance of the liquid crystal display panel 10 is saturated at the high value. The voltage Vx corresponds to a voltage at which birefringence of the liquid crystal layer 13 with a temperature falling within the isotropic phase temperature region is equal to or substantially equal to birefringence of the liquid crystal layer 13 with a temperature falling within the nematic phase temperature region.

[Effects]

Next, effects of the liquid crystal display 70 will be described below. In the case where the temperature of the liquid crystal layer 13 falls within the nematic phase temperature region, as illustrated in the parts (A) to (D) in FIG. 3, the direction of the director 13a of the liquid crystal layer 13 is changed by application of an electric field by the electrodes 15. Therefore, in the case where a voltage is not applied to the electrodes 15, or in the case where the voltage of the electrodes 15 is approximately 0 V, the orientation of the liquid crystal layer 13 is aligned in the vertical direction, and the light transmittance of the liquid crystal display panel 10 is close to 0%. Moreover, in the case where Vx (for example, V1) is applied to the electrodes 15, the orientation of the liquid crystal layer 13 is aligned in the horizontal direction as well as in a direction different from the crossed nicols direction, and the light transmittance of the liquid crystal display panel 10 is maximized, or is saturated at a high value. It is to be noted that the birefringence of the liquid crystal layer 13 when Vx (for example, V1) is applied to the electrodes 15 is Δnx.

In the case where the temperature of the liquid crystal layer 13 falls within the isotropic phase temperature region, as illustrated in the parts (A) to (D) in FIG. 4, the director 13a of the liquid crystal layer 13 is dissipated or induced by application of an electric field by the electrodes 15. Therefore, in the case where a voltage is not applied to the electrodes 15, or in the case where the voltage of the electrodes 15 is approximately 0 V, the liquid crystal layer 13 is in a non-alignment state, and the light transmittance of the liquid crystal display panel 10 is close to 0%. Moreover, in the case where Vx (for example, V1) is applied to the electrodes 15, the orientation of the liquid crystal layer 13 is aligned in the horizontal direction, and is induced to a direction different from the crossed nicols direction, and the light transmittance of the liquid crystal display panel 10 is maximized, or is saturated at a high value. When Vx (for example, V1) is applied to the electrodes 15, birefringence is generated in the liquid crystal layer 13, and a value of the birefringence is equal to or substantially equal to Δnx.

Thus, even if the temperature of the liquid crystal layer 13 falls within any of the nematic phase temperature region and the isotropic phase temperature region, in the case where a voltage is not applied to the electrodes 15, or in the case where the voltage of the electrodes 15 is approximately 0 V, the light transmittance of the liquid crystal display panel 10 is close to 0%. Moreover, in the case where Vx (for example, V1) is applied to the electrodes 15, the light transmittance is maximized, or is saturated at a high value. In other words, for example, in the case where the electrodes 15 are driven by two values, i.e., 0 V or a voltage of approximately 0 V and Vx (for example, V1), the optical characteristic in the nematic phase temperature region and the optical characteristic in the isotropic phase temperature region are similar to each other. Therefore, when the electrodes 15 are driven by the above-described two values, ideal black display and ideal white display are shared between the nematic phase temperature region and the isotropic phase temperature region. Moreover, in black display, the orientation of the liquid crystal layer 13 is aligned in the vertical direction; therefore, the floating black phenomenon is less likely to occur.

In summary, in the embodiment, in the case where the temperature of the liquid crystal layer 13 falls within the isotropic phase temperature region, Vx (for example, V1) is applied to the electrodes 15. Accordingly, in the case where the temperature of the liquid crystal layer 13 falls within the isotropic phase temperature region, Vx (for example, V1) is applied to the electrodes 15 to cause phase transition from a liquid state (an isotropic phase) to a liquid crystal state (a nematic phase) in the liquid crystal layer 13, and when the voltage applied to the electrodes 15 is removed, the liquid crystal layer 13 is returned to the original liquid state (the isotropic phase). Thus, in the embodiment, a change in light transmittance is allowed to be caused not only in the nematic phase temperature region but also in the isotropic phase temperature region. In this case, nematic phase induction/dissipation speed in the isotropic phase temperature region is extensively higher than director realignment speed in the nematic phase temperature region. Therefore, high-speed response is obtained with use of a change in light transmittance based on induction and dissipation of the nematic phase in the isotropic phase temperature region. Moreover, in the case where the temperature of the liquid crystal layer 13 falls within the isotropic phase temperature region, the director of the liquid crystal layer 13 is dissipated, and birefringence is not generated in the liquid crystal layer 13. Therefore, even if a foreign substance enters into the liquid crystal layer 13, light leakage due to disclination of the liquid crystal layer 13 is not caused in a region around the foreign substance of the liquid crystal layer 13. Accordingly, even if a change in the light transmittance based on induction and dissipation of the nematic phase in the isotropic phase temperature region is used, deep black luminance is obtained. Consequently, in the embodiment, when the electrodes 15 are driven by two values, i.e., 0 V or a voltage of approximately 0 V and Vx (for example, V1), high-speed response and high contrast are allowed to be obtained not only in the nematic phase temperature region but also in the isotropic phase temperature region. Accordingly, high-speed response and high contrast are allowed to be achieved in a wide temperature range.

It is to be noted that, in the embodiment, the drive circuit 71 may modulate output time of Vx (for example, V1) or the number of outputs of Vx (for example, V1) based on an externally supplied image signal. In such a case, halftone display is allowed to be achieved in addition to white display and black display.

4. Modifications of Third Embodiment

Figure 12:
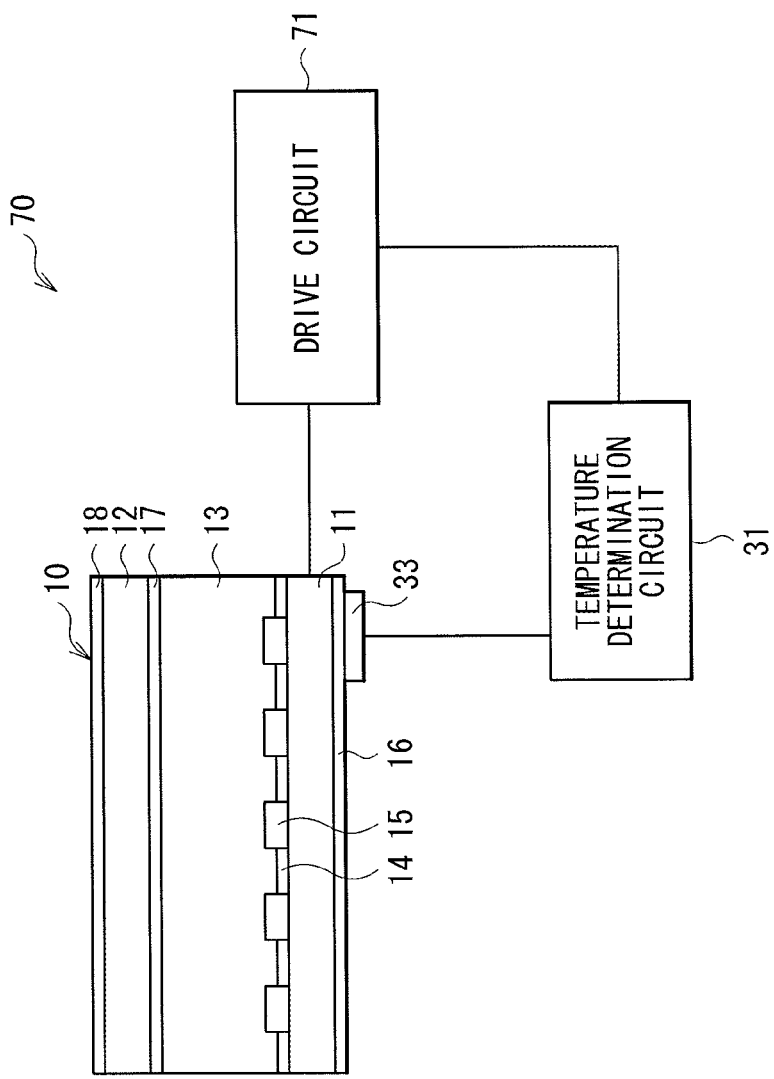
FIG. 12 is a diagram illustrating a modification of the configuration of the liquid crystal display in FIG. 10.

FIG. 12 illustrates a modification of the liquid crystal display 70 according to the third embodiment. The liquid crystal display 70 according to the modification corresponds to the liquid crystal display 70 according to the third embodiment additionally including the temperature sensor 33 and the temperature determination circuit 31.

The temperature sensor 33 detects the temperature of the liquid crystal layer 13, and outputs a detection signal to the temperature determination circuit 31. The temperature determination circuit 31 determines, based on the received detection signal, whether the temperature of the liquid crystal layer 13 is lower than the phase transition temperature, or equal to or higher than the phase transition temperature. Moreover, the temperature determination circuit 31 outputs a determination result to the drive circuit 71.

The drive circuit 71 is allowed to output, to the electrodes 15 of the liquid crystal display panel 10, a voltage in between 0 V or a voltage of approximately 0 V and Vx (for example, V1), in addition to the two values, i.e., 0 V or the voltage of approximately 0 V and Vx (for example, V1). The drive circuit 71 outputs any one of the following three voltages based on an externally supplied image signal.

(1) 0 V or a voltage of approximately 0 V
(2) Vx (for example, V1)
(3) Voltage in between 0 V or the voltage of approximately 0 V and Vx The drive circuit 71 supplies any one of the above-described three voltages to the electrodes 15 of the liquid crystal display panel 10 based on the received determination result. For example, the drive circuit 71 supplies, to the electrodes 15, a voltage equal to or higher than a maximum voltage (V2) (refer to FIG. 11) within a voltage range where the light transmittance of the liquid crystal display panel 10 is saturated at a low value in the case where the temperature of the liquid crystal layer 13 falls within the isotropic phase temperature region. Moreover, for example, the drive circuit 71 supplies a voltage equal to or lower than a minimum voltage (V3) (refer to FIG. 11) within a voltage range where the light transmittance of the liquid crystal display panel 10 is saturated at a high value in the case where the temperature of the liquid crystal layer 13 falls within the nematic phase temperature region. In such a case, halftones are allowed to be obtained.

5. Fourth Embodiment

Configuration

Figure 13:
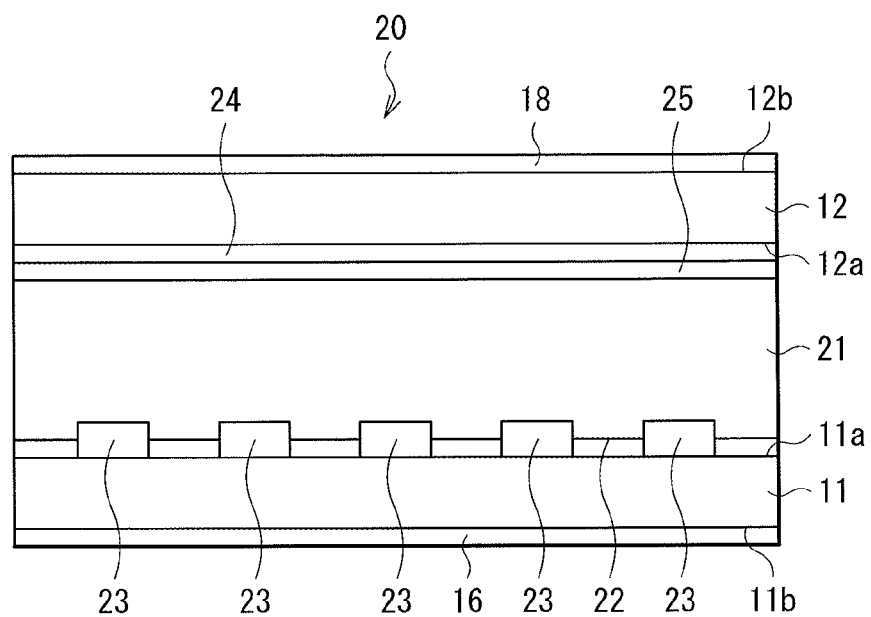
FIG. 13 is a diagram illustrating an example of a configuration of a liquid crystal display panel according to a fourth embodiment.

FIG. 13 is a sectional view illustrating an example of a configuration of a liquid crystal display panel 20 according to a fourth embodiment.

As in the case of the liquid crystal display panel 10, the liquid crystal display panel 20 includes the transparent substrates 11 and 12 facing each other and having insulation, and a liquid crystal layer 21 sandwiched between the transparent substrates 11 and 12.

The liquid crystal display panel 20 includes an alignment film 22, being in contact with the liquid crystal layer 21, on the surface 11a facing the transparent substrate 12 of the transparent substrate 11. The alignment film 22 is a horizontal alignment film aligning the orientation of the liquid crystal layer 21 in a horizontal direction. The horizontal alignment film is configured of, for example, a polyimide film. The liquid crystal display panel 20 further includes a plurality of electrodes 23 on the surface 11a of the transparent substrate 11. When a voltage is supplied to the plurality of electrodes 23, the electrodes 23 generate a vertical electric field in the liquid crystal layer 21 to change an orientation direction of the liquid crystal layer 21. The plurality of electrodes 23 are two-dimensionally arranged in, for example, a plane parallel to the surface 11a of the transparent substrate 11, and a potential difference is generated between the electrodes 23 and an electrode 24 which will be described later, thereby enabling to generate, in the liquid crystal layer 21, an electric field mainly in a direction orthogonal to or substantially orthogonal to the transparent substrate 11 (that is, the vertical direction). The liquid crystal display panel 20 includes the polarizing plate 16 on the surface 11b opposite to the surface 11a of the transparent substrate 11.

The liquid crystal display panel 20 includes the electrode 24 on the surface 12a facing the transparent substrate 11 of the transparent substrate 12. The electrode 24 is a sheet-like electrode formed on the entire surface 12a, and is disposed to face the electrodes 23. Therefore, the electrode 24 functions as a common electrode for the electrodes 23. The liquid crystal display panel 20 further includes, on the electrode 24, an alignment film 25 being in contact with the liquid crystal layer 21. The alignment film 25 is a horizontal alignment film aligning the orientation of the liquid crystal layer 21 in the horizontal direction. The horizontal alignment film is configured of, for example, a polyimide film. The liquid crystal display panel 20 includes the polarizing plate 18 on the surface 12b opposite to the surface 12a of the transparent substrate 12. In this case, the polarizing plate 16 and the polarizing plate 18 satisfy a crossed nicols condition, and are in a state where their absorption axes are different by about 45 degrees from the electrodes 23.

The liquid crystal layer 21 is made of a nematic liquid crystal having negative dielectric constant anisotropy. The liquid crystal layer 21 has a predetermined phase transition temperature (TNI), and when the temperature of the liquid crystal layer 21 is lower than the phase transition temperature, the liquid crystal layer 21 is in the nematic phase, and when the temperature of the liquid crystal layer 21 is equal to or higher than the phase transition temperature, the liquid crystal layer 21 is in the isotropic phase which is a liquid phase.

In the isotropic-phase temperature region, the liquid crystal layer 21 is in the isotropic phase; therefore, light passing through the liquid crystal layer 21 is not affected. As the polarizing plates 16 and 18 are arranged in a crossed nicols state, light passing through one polarizing plate 16 to be converted into linearly polarized light is not allowed to pass through the other polarizing plate 18.

However, when a voltage is supplied to the electrodes 23 to apply an electric field to the liquid crystal layer 21, the nematic phase is induced. As a phase of light passing through the nematic phase is changed by the electro-optical Kerr effect, the phase of light passing through one polarizing plate 16 to be converted into linearly polarized light is changed while the light passes through the nematic phase, thereby allowing the light to pass through the other polarizing plate 18. Consequently, the liquid crystal display panel 20 is of a normally black type.

Figure 14:
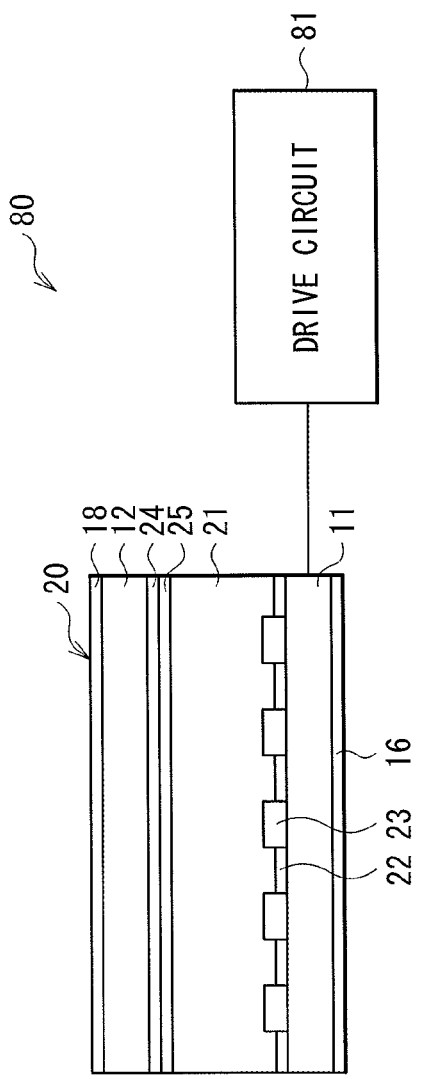
FIG. 14 is a diagram illustrating an example of a configuration of a liquid crystal display according to the fourth embodiment.

Next, a liquid crystal display using the liquid crystal display panel 20 will be described below. FIG. 14 is a diagram illustrating an example of a liquid crystal display 80 according to the fourth embodiment. The liquid crystal display 80 includes the liquid crystal display panel 20, a drive circuit 81 driving the liquid crystal display panel 20, and a backlight (not illustrated) illuminating the liquid crystal display panel 20 from a back side of the liquid crystal display panel 20.

Next, the drive circuit 81 will be described below. The drive circuit 81 applies, to the electrode 23, a voltage within a predetermined range (hereinafter referred to as Vy for the sake of convenience) irrespective of the temperature of the liquid crystal layer 21. More specifically, the drive circuit 81 applies, to each of the electrodes 23, the voltage Vy causing a potential difference between the electrodes 23 and the electrode 24 to perform black display. Moreover, the drive circuit 81 applies a voltage (for example, 0 V or a voltage of approximately 0 V) different from Vy irrespective of the temperature of the liquid crystal layer 21 to perform white display.

In this case, Vy represents a voltage equal to or higher than a voltage (V4) at which light transmittance of the liquid crystal display panel 20 is maximized (or a minimum voltage within a voltage range where the light transmittance of the liquid crystal display panel 20 is saturated at a high value) (refer to FIG. 17), as well as a voltage equal to or lower than a maximum voltage within the voltage range where the light transmittance of the liquid crystal display panel 20 is saturated at the high value. The voltage Vy corresponds to a voltage at which birefringence of the liquid crystal layer 21 with a temperature falling within the isotropic phase temperature region is equal to or substantially equal to birefringence of the liquid crystal layer 21 with a temperature falling within the nematic phase temperature region.

[Operation]

Figure 16:
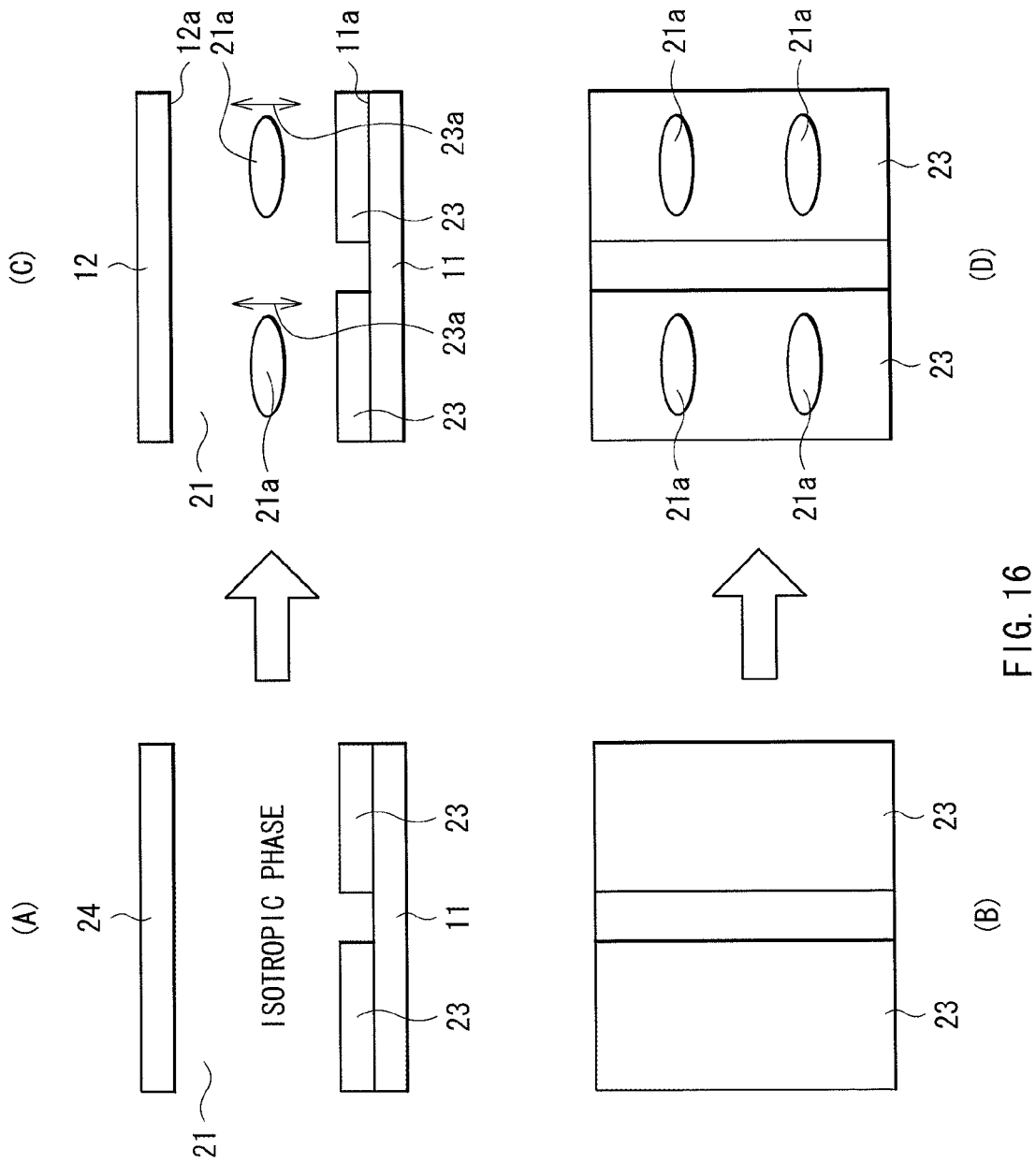
FIGS. 16A-16D illustrate another example of the state of the liquid crystal layer in FIG. 13.

Next, a state of the liquid crystal layer 21 of the liquid crystal display panel 20 will be described below. Parts (A) to (D) in FIG. 15 and parts (A) to (D) in FIG. 16 are diagrams illustrating examples of the state of the liquid crystal layer 21. The parts (A) to (D) in FIG. 15 illustrate the case where the temperature of the liquid crystal layer 21 falls within the nematic phase temperature region. The parts (A) and (B) in FIG. 15 illustrate the case where a voltage is not supplied to the electrodes 23, and the parts (C) and (D) in FIG. 15 illustrate the case where a voltage is supplied to the electrodes 23. It is to be noted that the parts (A) and (C) in FIG. 15 are sectional views and the parts (B) and (D) in FIG. 15 are plan views.

As illustrated in the parts (A) and (B) in FIG. 15, in the case where a voltage is not supplied to the electrodes 23, that is, in the case where an electric field is not applied to the liquid crystal layer 21, a director 21a of the liquid crystal layer 21 is aligned in the vertical direction. In other words, a long-axis direction of the director 21a is aligned in a direction orthogonal to the surface 11a of the transparent substrate 11 and the surface 12a of the transparent substrate 12.

As illustrated in the parts (C) and (D) in FIG. 15, in the case where a voltage is supplied to the electrodes 23, that is, in the case where a vertical electric field 23a is applied to the liquid crystal layer 21, the director 21a of the liquid crystal layer 21 is aligned in the horizontal direction. In other words, the long-axis direction of the director 21a is aligned in a direction parallel to the surface 11a of the transparent substrate 11 and the surface 12a of the transparent substrate 12.

The parts (A) to (D) in FIG. 16 are diagrams in the case where the temperature of the liquid crystal layer 21 falls within the isotropic phase temperature region. The parts (A) and (B) in FIG. 16 illustrate the case where a voltage is not supplied to the electrodes 23. The parts (C) and (D) in FIG. 16 illustrate the case where a voltage is supplied to the electrodes 23. It is to be noted that the parts (A) and (C) in FIG. 16 are sectional views, and the parts (B) and (D) in FIG. 16 are plan views.

As illustrated in the parts (A) and (B) in FIG. 16, in the case where a voltage is not supplied to the electrodes 23, that is, in the case where an electric field is not applied to the liquid crystal layer 21, the liquid crystal layer 21 is in the isotropic phase. In other words, in the liquid crystal layer 21, the nematic phase is dissipated.

As illustrated in the parts (C) and (D) in FIG. 16, in the case where a voltage is supplied to the electrodes 23, that is, in the case where the vertical electric field 23a is applied to the liquid crystal layer 21, the nematic phase is induced in the liquid crystal layer 21. In this case, the director 21a of the liquid crystal layer 21 is aligned in the horizontal direction. In other words, the long-axis direction of the director 21a is aligned in a direction parallel to the surface 11a of the transparent substrate 11 and the surface 12a of the transparent substrate 12.

Figure 17:
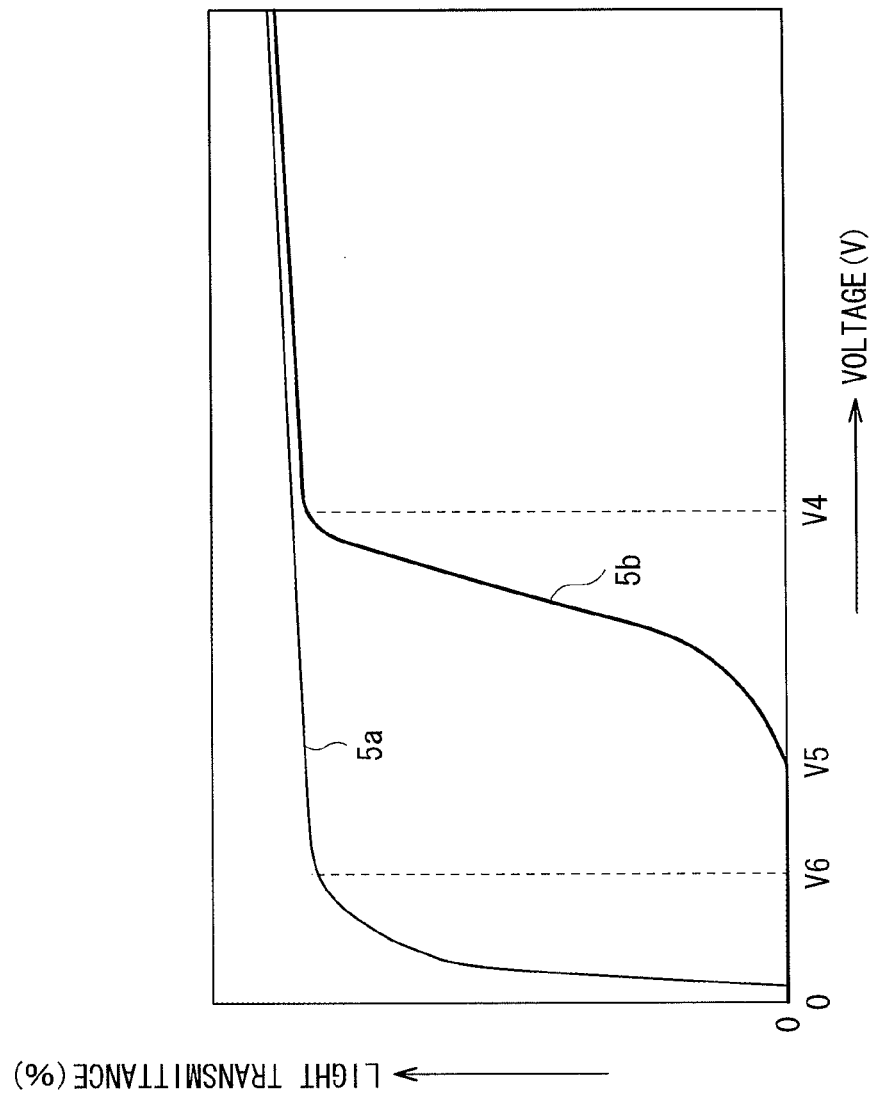
FIG. 17 is a diagram illustrating an example of light transmittance of the liquid crystal display panel in FIG. 13.

Next, light transmittance of the liquid crystal display panel 20 will be described below. FIG. 17 is a diagram illustrating an example of light transmittance of the liquid crystal display panel 20. A horizontal axis and a vertical axis in FIG. 17 represent a voltage (V) supplied to the electrodes 23 and light transmittance (%) of the liquid crystal display panel 20, respectively. A characteristic 5a represents a light transmittance characteristic in the nematic phase temperature region, and a characteristic 5b represents a light transmittance characteristic in the isotropic phase temperature region.

As illustrated by the characteristics 5a and 5b, upper-limit light transmittance in the nematic phase temperature region and upper-limit light transmittance in the isotropic phase temperature region are substantially equal to each other. As a result, in the liquid crystal display 80, switching between white and black is allowed to be performed without consideration of a relationship between the crossed nicols state of the polarizing plates 16 and 18 of the liquid crystal display panel 20 and an orientation axis of the liquid crystal layer 21.

[Effects]

Next, effects of the liquid crystal display 80 will be described below. In the case where the temperature of the liquid crystal layer 21 falls within the nematic phase temperature region, as illustrated in the parts (A) to (D) in FIG. 15, the direction of the director 21a of the liquid crystal layer 21 is changed by application of an electric field by the electrodes 23. Therefore, in the case where a voltage is not applied to the electrodes 23, or in the case where the voltage of the electrodes 23 is approximately 0 V, the orientation of the liquid crystal layer 21 is aligned in the vertical direction, and the light transmittance of the liquid crystal display panel 20 is close to 0%. Moreover, in the case where Vy (for example, V4) is applied to the electrodes 23, the orientation of the liquid crystal layer 21 is aligned in the horizontal direction, as well as in a direction different from the crossed nicols direction, and the light transmittance of the liquid crystal display panel 20 is maximized, or is saturated at a high value. It is to be noted that birefringence of the liquid crystal layer 21 when Vy (for example, V4) is applied to the electrodes 23 is Δny.

In the case where the temperature of the liquid crystal layer 21 falls within the isotropic phase temperature region, as illustrated in the parts (A) to (D) in FIG. 16, the director 21a of the liquid crystal layer 21 is dissipated or induced by application of an electric field by the electrodes 23. Therefore, in the case where a voltage is not applied to the electrodes 23, or in the case where the voltage of the electrode 23 is approximately 0 V, the liquid crystal layer 21 is in a non-alignment state, and the light transmittance of the liquid crystal display panel 20 is close to 0%. Moreover, in the case where Vy (for example, V4) is applied to the electrodes 23, the orientation of the liquid crystal layer 21 is aligned in the horizontal direction, and is induced to a direction different from the crossed nicols direction, and the light transmittance of the liquid crystal display panel 20 is maximized, or is saturated at a high value. When Vy (for example, V4) is applied to the electrodes 23, birefringence is generated in the liquid crystal layer 21, and a value of the birefringence is equal to or substantially equal to Δny.

Thus, even if the temperature of the liquid crystal layer 21 falls within any of the nematic phase temperature region and the isotropic phase temperature region, in the case where a voltage is not applied to the electrodes 23, or in the case where the voltage of the electrodes 23 is approximately 0 V, the light transmittance of the liquid crystal display panel 20 is close to 0%. Moreover, in the case where Vy (for example, V4) is applied to the electrodes 23, the light transmittance of the liquid crystal display panel 20 is maximized, or is saturated at a high value. In other words, for example, in the case where the electrodes 23 are driven by two values, i.e., 0 V or a voltage of approximately 0 V and Vy (for example, V4), the optical characteristic in the nematic phase temperature region and the optical characteristic in the isotropic phase temperature region are similar to each other. Therefore, when the electrodes 23 are driven by the above-described two values, ideal black display and ideal white display are allowed to be shared between the nematic phase temperature region and the isotropic phase temperature region. Moreover, in black display, the orientation of the liquid crystal layer 21 is aligned in the vertical direction; therefore, the floating black phenomenon is less likely to occur.

In summary, in the embodiment, in the case where the temperature of the liquid crystal layer 21 falls within the isotropic phase temperature region, Vy (for example, V4) is applied to the electrodes 23. Accordingly, in the case where the temperature of the liquid crystal layer 21 falls within the isotropic phase temperature region, Vy (for example, V4) is applied to the electrodes 23 to cause phase transition from the liquid state (the isotropic phase) to the liquid crystal state (the nematic phase) in the liquid crystal layer 21, and when the voltage applied to the electrodes 23 is removed, the liquid crystal layer 21 is returned to the original liquid state (the isotropic phase). Thus, in the embodiment, a change in light transmittance is allowed to be caused not only in the nematic phase temperature region but also in the isotropic phase temperature region. In this case, nematic phase induction/dissipation speed in the isotropic phase temperature region is extensively higher than director realignment speed in the nematic phase temperature region. Therefore, high-speed response is obtained with use of a change in light transmittance based on induction and dissipation of the nematic phase in the isotropic phase temperature region. Moreover, in the case where the temperature of the liquid crystal layer 21 falls within the isotropic phase temperature region, the director of the liquid crystal layer 21 is dissipated, and birefringence is not generated in the liquid crystal layer 21. Therefore, even if a foreign substance enters into the liquid crystal layer 21, light leakage due to disclination of the liquid crystal layer 21 is not caused in a region around the foreign substance of the liquid crystal layer 21. Accordingly, even if a change in the light transmittance based on induction and dissipation of the nematic phase in the isotropic phase temperature region is used, deep black luminance is obtained. Consequently, in the embodiment, when the electrodes 23 are driven by two values, i.e., 0 V or a voltage of approximately 0 V and Vy (for example, V4), high-speed response and high contrast are allowed to be obtained not only in the nematic phase temperature region but also in the isotropic phase temperature region. Accordingly, high-speed response and high contrast are allowed to be achieved in a wide temperature range.

It is to be noted that, in the embodiment, the drive circuit 81 may modulate output time of Vy (for example, V4) or the number of outputs of Vy (for example, V4) based on an externally supplied image signal. In such a case, halftone display is allowed to be achieved in addition to white display and black display.

6. Modifications of Fourth Embodiment

Figure 18:
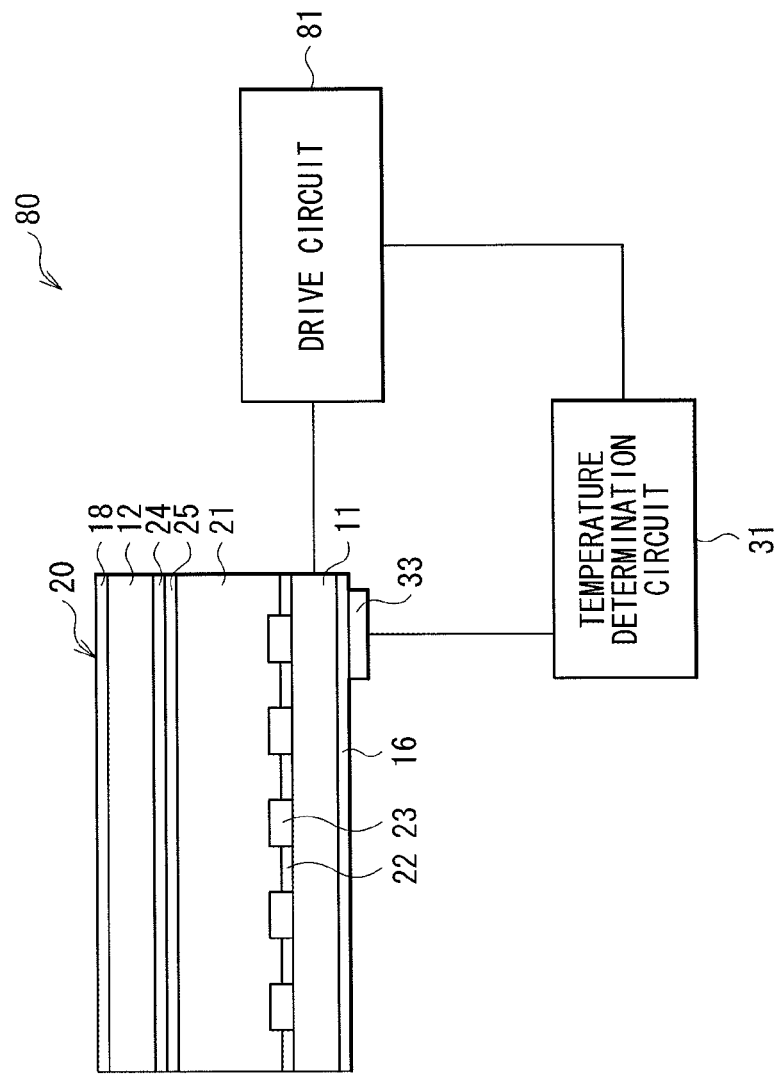
FIG. 18 is a diagram illustrating a modification of the configuration of the liquid crystal display in FIG. 14.

FIG. 18 illustrates a modification of the liquid crystal display 80 according to the fourth embodiment. The liquid crystal display 80 according to the modification corresponds to the liquid crystal display 80 according to the fourth embodiment additionally including the temperature sensor 33 and the temperature determination circuit 31.

The temperature sensor 33 detects the temperature of the liquid crystal layer 21, and outputs a detection signal to the temperature determination circuit 31. The temperature determination circuit 31 determines, based on the received detection signal, whether the temperature of the liquid crystal layer 21 is lower than the phase transition temperature, or equal to or higher than the phase transition temperature. Moreover, the temperature determination circuit 31 outputs a determination result to the drive circuit 81.

The drive circuit 81 is allowed to output, to the electrodes 23 of the liquid crystal display panel 20, a voltage in between 0 V or a voltage of approximately 0 V and Vy (for example, V4) in addition to the two values, i.e., 0 V or the voltage of approximately 0 V and Vy (for example, V4). The drive circuit 81 outputs any one of the following three voltages based on an externally supplied image signal.
(1) 0 V or a voltage of approximately 0 V
(2) Vy (for example, V4)
(3) Voltage in between 0 V or the voltage of approximately 0 V and Vy (for example, V4)

The drive circuit 81 supplies any one of the above-described three voltages to the electrodes 23 of the liquid crystal display panel 20 based on the received determination result. For example, the drive circuit 81 supplies, to the electrodes 23, a voltage equal to or higher than a maximum voltage (V5) (refer to FIG. 17) within a voltage range where the light transmittance of the liquid crystal display panel 20 is saturated at a low value in the case where the temperature of the liquid crystal layer 21 falls within the isotropic phase temperature region. Moreover, for example, the drive circuit 81 supplies a voltage equal to or lower than a minimum voltage (V6) (refer to FIG. 17) within a voltage range where the light transmittance of the liquid crystal display panel 20 is saturated at a high value in the case where the temperature of the liquid crystal layer 21 falls within the nematic phase temperature region. In such a case, halftones are allowed to be obtained.

7. Application Example

Figure 19:
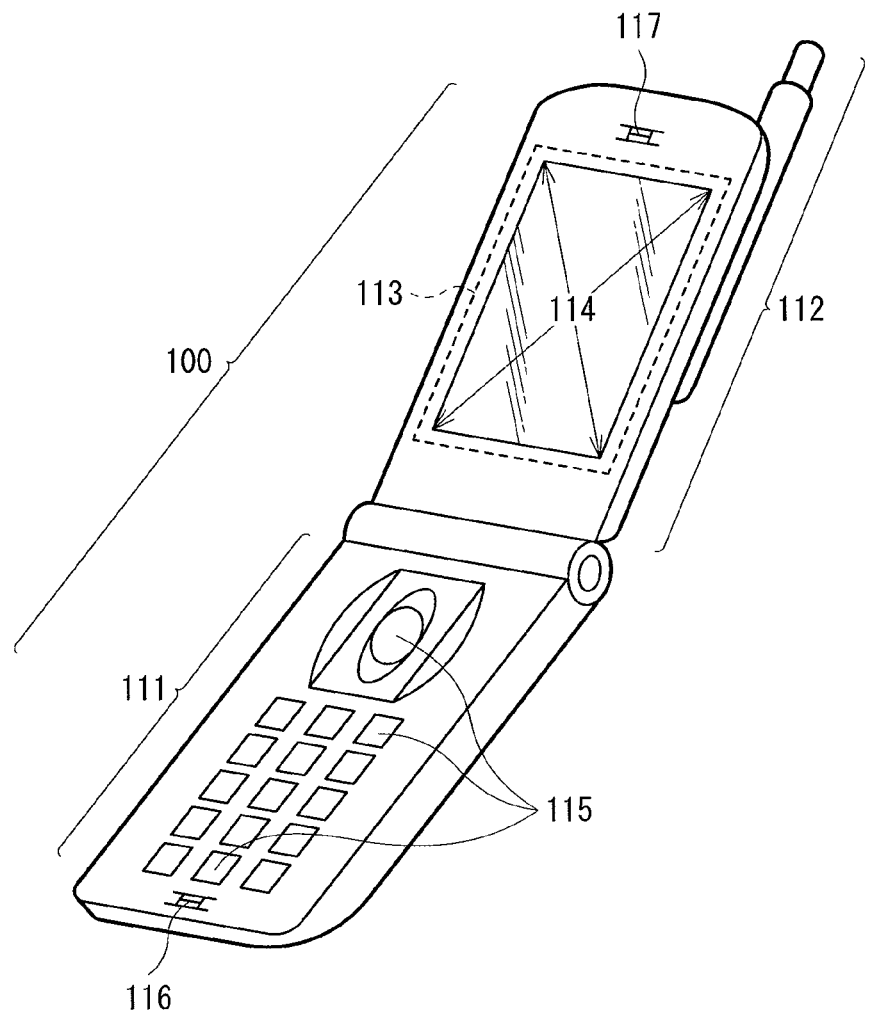
FIG. 19 is a perspective view illustrating an example of a configuration of an electronic unit according to an application example.

Next, an application example of any of the liquid crystal displays 30, 60, 70, and 80 according to the above-described embodiments and modifications thereof will be described below. FIG. 19 is a perspective view of an example of a schematic configuration of an electronic unit 100 according to the application example. The electronic unit 100 is a cellular phone, and, for example, as illustrated in FIG. 19, the electronic unit 100 includes a main body section 111, and a display body section 112 openable and closable with respect to the main body section 111. The main body section 111 includes operation buttons 115 and a transmitter section 116. The display body section 112 includes a display 113 and a receiver section 117. The display 113 displays various indications for telephone communication on a display screen 114 thereof. The electronic unit 100 includes a control section (not illustrated) to control the operation of the display 113. The control section is disposed in the main body section 111 or the display body section 112 as a part of a control section controlling the whole electronic unit 100 or a control section different from the control section controlling the whole electronic unit 100.

The display 113 has the same configuration as that of any of the liquid crystal displays 30, 60, 70, and 80 according to the above-described embodiments and modifications thereof. Therefore, in the display 113, high contrast is allowed to be obtained in a wide temperature range.

It is to be noted that, in addition to the above-described cellular phone, electronic units to which any of the liquid crystal displays 30, 60, 70, and 80 according to the above-described embodiments and modifications thereof is applicable include a personal computer, a liquid crystal television, a viewfinder type or monitor direct-view type videotape recorder, a car navigation system, a pager, an electronic organizer, an electronic calculator, a word processor, a work station, a videophone, a POS terminal, and the like.

8. Modification

Although the present technology is described referring to the embodiments, the modifications thereof, and the application examples thereof, the technology is not limited thereto, and may be variously modified.

For example, in the above-described embodiments, the liquid crystal display panels 10 and 20 are of a normally black type; however, they may be of a normally white type. In other words, in the liquid crystal display panel 10 or 20, the polarizing plates 16 and 18 may satisfy a parallel nicols condition in a state where their absorption axes are different by about 90 degrees from the electrodes 15 or 23.

In this case, the drive circuit 71 or 81 applies a voltage within a predetermined range (hereinafter referred to as Vz for the sake of convenience) to the electrodes 15 (or electrodes 23 or 24) irrespective of the temperature of the liquid crystal layer 13 or 21. More specifically, when the electrodes 15 each have, for example, a strip-like shape extending in one direction in a plane parallel to the surface 11a of the transparent substrate 11, the drive circuit 71 applies, to each of the electrodes 15, a voltage Vz causing a potential difference between two adjacent electrodes 15 to perform black display. Moreover, for example, the drive circuit 81 applies, to each of the electrodes 23 and 24, a voltage Vz causing a potential difference between two facing electrodes 23 and 24 to perform black display. Further, the drive circuits 71 and 81 apply a different voltage (for example, 0 V or a voltage of approximately 0 V) from Vz irrespective of the temperatures of the liquid crystal layers 13 and 21 to perform white display.

Figure 20:
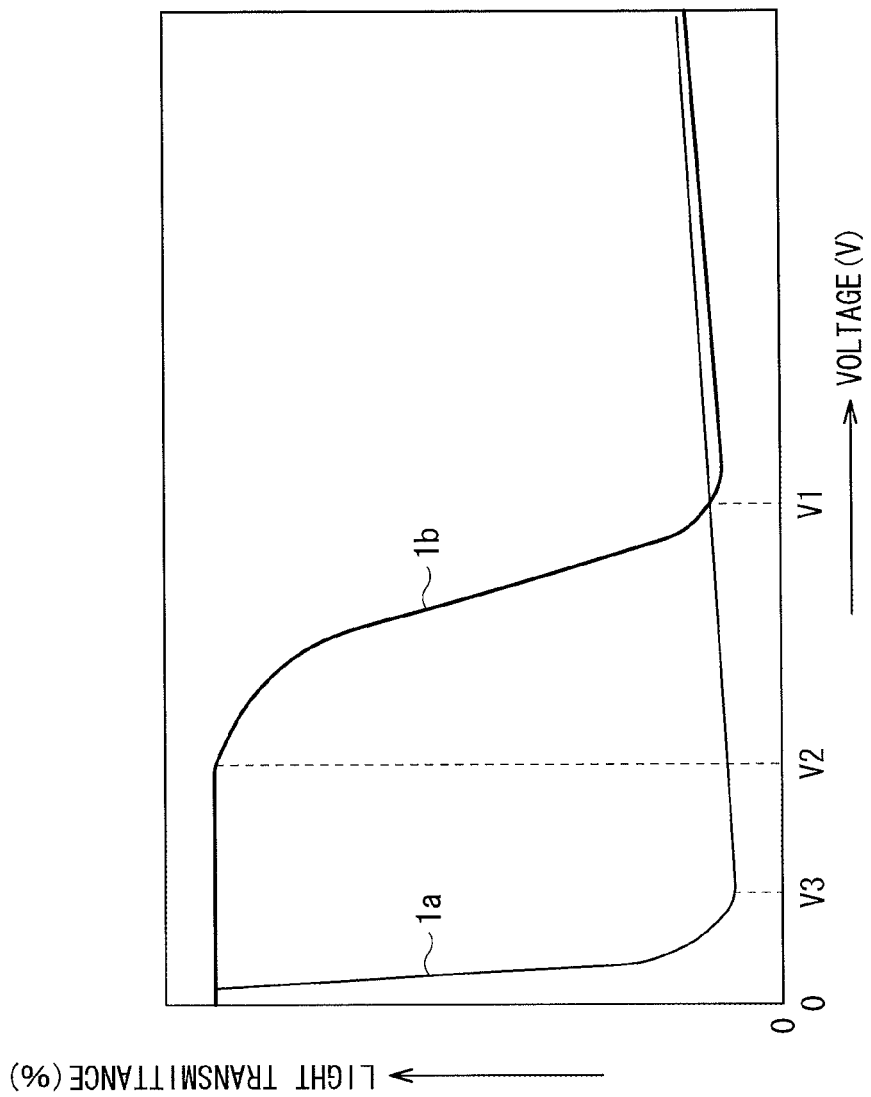
FIG. 20 is a diagram illustrating another example of light transmittance of the liquid crystal display panel in FIG. 1.
Figure 21:
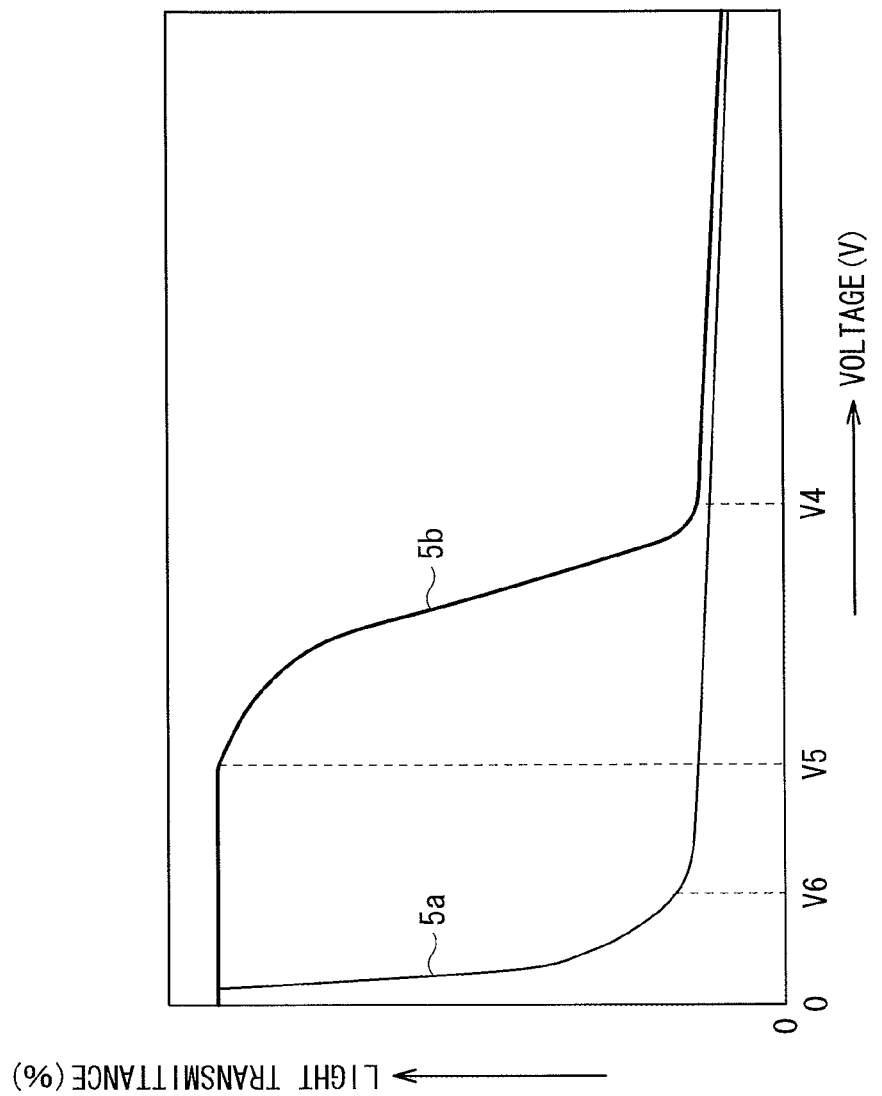
FIG. 21 is a diagram illustrating another example of light transmittance of the liquid crystal display panel in FIG. 13.
Figure 22:
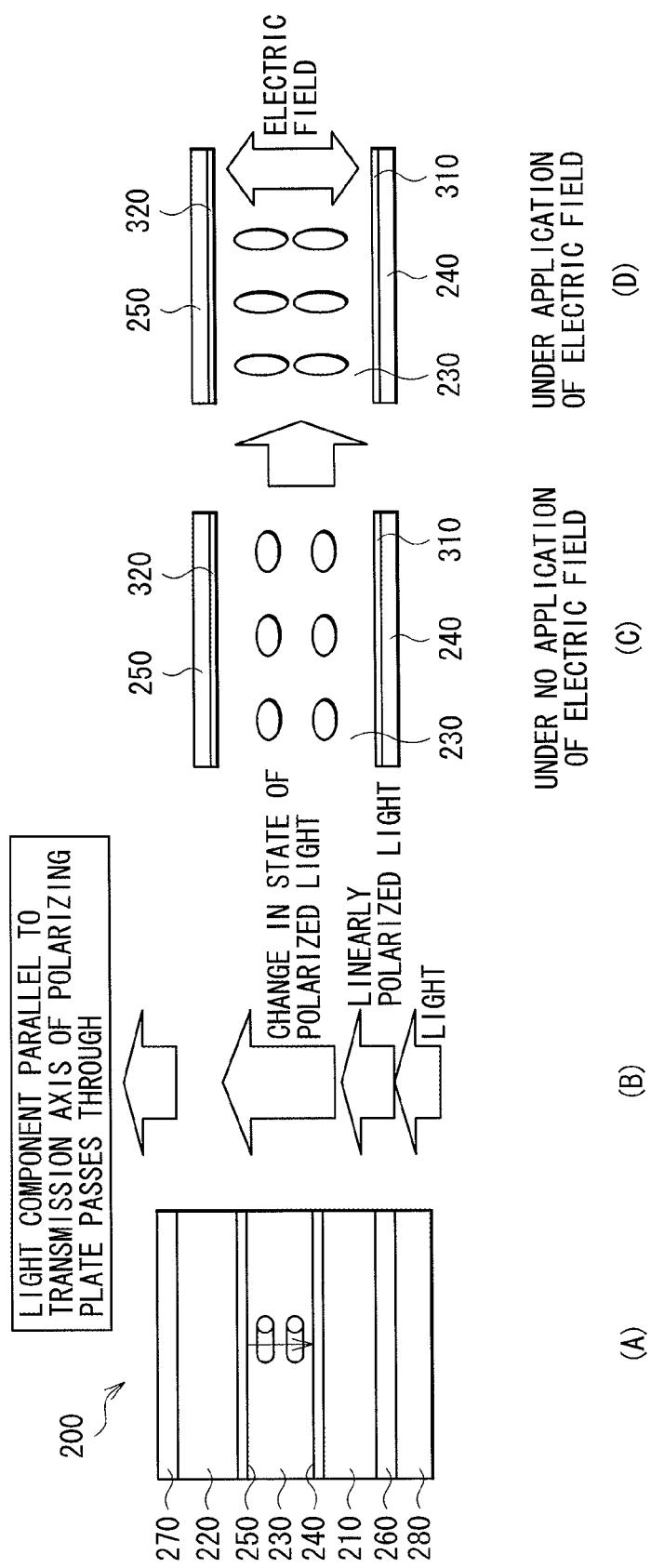
FIGS. 22A-22D illustrate an example of a configuration of a liquid crystal display in related art.

In this case, Vz represents a voltage equal to or higher than a voltage at which the light transmittance of the liquid crystal display panel 10 or 20 is minimized when the temperature of liquid crystal layer 13 or 21 falls within the isotropic phase temperature region or a minimum voltage (V1 or V4) (refer to FIGS. 20 and 21) within a voltage range where the light transmittance of the liquid crystal display panel 10 or 20 is saturated at a low value, as well as a voltage equal to or lower than a maximum voltage within the voltage range where the light transmittance of the liquid crystal display panel 10 or 20 is saturated at the low value. The voltage Vz corresponds to a voltage at which birefringence of the liquid crystal layer 13 or 21 with a temperature falling within the isotropic phase temperature region is equal to or substantially equal to birefringence of the liquid crystal layer 13 or 21 with a temperature falling within the nematic phase temperature region.

Next, effects of the modification will be described below. In the case where the temperature of the liquid crystal layer 13 or 21 falls within the nematic phase temperature region, the direction of the director of the liquid crystal layer 13 or 21 is changed by application of an electric field by the electrodes 15 or 23. Therefore, in the case where a voltage is not applied to the electrodes 15 or 23, or the voltage of the electrodes 15 or 23 is approximately 0 V, the orientation of the liquid crystal layer 13 or 21 is aligned in the vertical direction, and the light transmittance of the liquid crystal display panel 10 or 20 is maximized, or is saturated at a high value (refer to FIGS. 20 and 21). Moreover, in the case where Vz (for example, V1 or V4) is applied to the electrodes 15 or 23, the orientation of the liquid crystal layer 13 or 21 is aligned in the horizontal direction as well as a direction different from a parallel nicols direction, and the light transmittance of the liquid crystal display panel 10 or 20 is close to 0%.

In the case where the temperature of the liquid crystal layer 13 or 21 falls within the isotropic phase temperature region, the director of the liquid crystal layer 13 or 21 is dissipated or induced by application of an electric field by the electrodes 15 or 23. Therefore, in the case where a voltage is not applied to the electrodes 15 or 23, or in the case where the voltage of the electrodes 15 or 23 is approximately 0 V, the liquid crystal layer 13 or 21 is in a non-alignment state, and the light transmittance of the liquid crystal display panel 10 or 20 is maximized or are saturated at a high value. Moreover, in the case where Vz (for example, V1 or V4) is applied to the electrodes 15 or 23, the orientation of the liquid crystal layer 13 or 21 is aligned in the horizontal direction, and is induced in a direction different from the parallel nicols direction, and the light transmittance of the liquid crystal display panel 10 or 20 is maximized, or is saturated at a high value. When Vz (for example, V1 or V4) is applied to the electrodes 15 or 23, birefringence is generated in the liquid crystal layer 13 or 21, and a value of the birefringence is equal to or substantially equal to that when Vz is applied to the electrodes 15 or 23 in the case where the temperature of the liquid crystal layer 13 or 21 falls within the nematic phase temperature region.

Thus, even if the temperature of the liquid crystal layer 13 or 21 falls within any of the nematic phase temperature region and the isotropic phase temperature region, in the case where a voltage is not applied to the electrodes 15 or 23, or in the case where the voltage of the electrodes 15 or 23 is approximately 0 V, the light transmittance of the liquid crystal display panel 10 or 20 is maximized, or is saturated at a high value. Moreover, in the case where Vz (for example, V1 or V4) is applied to the electrodes 15 or 23, the light transmittance is close to 0%. In other words, for example, in the case where the electrodes 15 or 23 are driven by two values, i.e., 0 V or a voltage of approximately 0 V and $V_Z$ (for example, V1 or V4), the optical characteristic in the nematic phase temperature region and the optical characteristic in the isotropic phase temperature region are similar to each other. Therefore, when the electrodes 15 or 23 are driven by the above-described two values, ideal black display and ideal white display are allowed to be shared between the nematic phase temperature region and the isotropic phase temperature region. Moreover, in black display, the orientation of the liquid crystal layer 13 or 21 is aligned in the vertical direction; therefore, the floating black phenomenon is less likely to occur.

In summary, in the modification, in the case where the temperature of the liquid crystal layer 13 or 21 falls within the isotropic phase temperature region, Vz (for example, V1 or V4) is applied to the electrodes 15 or 23. Accordingly, in the case where the temperature of the liquid crystal layer 13 or 21 falls within the isotropic phase temperature region, Vz (for example, V1 or V4) is applied to the electrodes 15 or 23 to cause phase transition from the liquid state (the isotropic phase) to the liquid crystal state (the nematic phase) in the liquid crystal layer 13 or 21, and when the voltage applied to the electrodes 15 or 23 is removed, the liquid crystal layer 13 or 21 is returned to the original liquid state (the isotropic phase). Thus, in the modification, a change in light transmittance is allowed to be caused not only in the nematic phase temperature region but also in the isotropic phase temperature region. In this case, nematic phase induction/dissipation speed in the isotropic phase temperature region is extensively higher than director realignment speed in the nematic phase temperature region. Therefore, high-speed response is obtained with use of a change in light transmittance based on induction and dissipation of the nematic phase in the isotropic phase temperature region. Moreover, in the case where the temperature of the liquid crystal layer 13 or 21 falls within the isotropic phase temperature region, the director of the liquid crystal layer 13 or 21 is dissipated, and birefringence is not generated in the liquid crystal layer 13 or 21. Therefore, even if a foreign substance enters into the liquid crystal layer 13 or 21, light leakage due to disclination of the liquid crystal layer 13 or 21 is not caused in a region around the foreign substance of the liquid crystal layer 13 or 21. Accordingly, even if a change in the light transmittance based on induction and dissipation of the nematic phase in the isotropic phase temperature region is used, deep black luminance is obtained. Consequently, in the modification, when the electrodes 15 or 23 are driven by two values, i.e., 0 V or a voltage of approximately 0 V and Vz (for example, V1 or V4), high-speed response and high contrast are allowed to be obtained not only in the nematic phase temperature region but also in the isotropic phase temperature region. Accordingly, high-speed response and high contrast are allowed to be achieved in a wide temperature range.

It is to be noted that, in the modification, the drive circuit 71 or 81 may modulate output time of Vz (for example, V1 or V4) or the number of outputs of Vz (for example, V1 or V4) based on an externally supplied image signal. In such a case, halftone display is allowed to be achieved in addition to white display and black display.

Moreover, in the modification, the temperature sensor 33 and the temperature determination circuit 31 may be further included. In this case, the drive circuit 71 or 81 may output a voltage in between a voltage (0 V) where the light transmittance of the liquid crystal display panel 10 or 20 is saturated at a high value in the case where the temperature of the liquid crystal layer 13 or 21 falls within the nematic phase temperature region (refer to FIGS. 20 and 21) and the voltage Vz (for example, V1 or V4). Moreover, for example, the drive circuit 71 or 81 may output a voltage in between a maximum voltage (V2 or V5) (refer to FIGS. 20 and 21) within a voltage range where the transmittance of the liquid crystal display panel 10 or 20 is saturated at a high value in the case where the temperature of the liquid crystal layer 13 or 21 falls within the isotropic phase temperature region, and the voltage Vz (for example, V1 or V4). In such a case, halftones are allowed to be obtained.

Moreover, the present technology is allowed to have the following configurations.

(1) A liquid crystal display panel including:
a liquid crystal layer including a liquid crystal material with positive dielectric constant anisotropy;
a vertical alignment film being in contact with the liquid crystal layer;
a first substrate and a second substrate disposed to face each other with the liquid crystal layer in between; and
an electrode disposed on a surface of one or both of the first substrate and the second substrate and generating, in the liquid crystal layer, an electric field in a direction orthogonal to or intersecting with a normal to the first substrate.

(2) The liquid crystal display panel according to (1), wherein
a direction of a director of the liquid crystal layer is changed by application of an electric field by the electrode when a temperature of the liquid crystal layer falls within a nematic phase temperature region, and
the director of the liquid crystal layer is dissipated or induced by application of an electric field by the electrode when the temperature of the liquid crystal layer falls within an isotropic phase temperature region.

(3) A liquid crystal display including a liquid crystal display panel, and a drive circuit driving the liquid crystal display panel, the liquid crystal display panel including:
a liquid crystal layer including a liquid crystal material with positive dielectric constant anisotropy;
a vertical alignment film being in contact with the liquid crystal layer;
a first substrate and a second substrate disposed to face each other with the liquid crystal layer in between; and
an electrode disposed on a surface of one or both of the first substrate and the second substrate and generating, in the liquid crystal layer, an electric field in a direction orthogonal to or intersecting with a normal to the first substrate.

(4) The liquid crystal display according to (3), wherein
a direction of a director of the liquid crystal layer is changed by application of an electric field by the electrode when a temperature of the liquid crystal layer falls within a nematic phase temperature region, and
the director of the liquid crystal layer is dissipated or induced by application of an electric field by the electrode when the temperature of the liquid crystal layer falls within an isotropic phase temperature region.

(5) The liquid crystal display according to (4), wherein
the drive circuit applies a first voltage to the electrode when the temperature of the liquid crystal layer falls within the isotropic phase temperature region, the first voltage allowing birefringence of the liquid crystal layer to be equal to or substantially equal to birefringence of the liquid crystal layer having the temperature which falls within the nematic phase temperature region.

(6) The liquid crystal display according to (5), wherein
the drive circuit applies the first voltage to the electrode irrespective of the temperature of the liquid crystal layer.

(7) The liquid crystal display according to (5), wherein
the drive circuit drives the electrode with use of two values including the first voltage and a second voltage different from the first voltage.

(8) The liquid crystal display according to (7), wherein
the second voltage is zero volts or a value close to zero volts.

(9) The liquid crystal display according to (4), wherein
the liquid crystal display panel includes a pair of polarizing plates disposed to face each other with the first substrate and the second substrate in between.

(10) The liquid crystal display according to (9), wherein
the pair of polarizing plates satisfy a crossed nicols condition, and are in a state where their absorption axes are different by about 45 degrees from a direction of the electric field, and
the drive circuit applies a third voltage to the electrode to perform white display, the third voltage being equal to or higher than a voltage at which light transmittance of the liquid crystal display panel is maximized when the temperature of the liquid crystal layer falls within the isotropic phase temperature region.

(11) The liquid crystal display according to (10), wherein
the drive circuit applies the third voltage to the electrode irrespective of the temperature of the liquid crystal layer.

(12) The liquid crystal display according to (10), wherein
the drive circuit drives the electrode with use of two values including the third voltage and a fourth voltage different from the third voltage.

(13) The liquid crystal display according to (12), wherein
the drive circuit applies the fourth voltage to the electrode to perform black display.

(14) The liquid crystal display according to (9), wherein
the pair of polarizing plates satisfy a parallel nicols condition, and are in a state where their absorption axes are different by about 90 degrees from a direction of the electric field, and
the drive circuit applies a fifth voltage to the electrode to perform black display, the fifth voltage being equal to or higher than a voltage at which light transmittance of the liquid crystal display panel is minimized when the temperature of the liquid crystal layer falls within the isotropic phase temperature region.

(15) The liquid crystal display according to (14), wherein
the drive circuit applies the fifth voltage to the electrode irrespective of the temperature of the liquid crystal layer.

(16) The liquid crystal display according to (14), wherein
the drive circuit drives the electrode with use of two values including the fifth voltage and a sixth voltage different from the fifth voltage.

(17) The liquid crystal display according to (16), wherein
the drive circuit applies the sixth voltage to the electrode to perform white display.

(18) An electronic unit including a liquid crystal display as a display section, the liquid crystal display including a liquid crystal display panel, and a drive circuit driving the liquid crystal display panel, the liquid crystal display panel comprising:
a liquid crystal layer including a liquid crystal material with positive dielectric constant anisotropy;
a vertical alignment film being in contact with the liquid crystal layer;
a first substrate and a second substrate disposed to face each other with the liquid crystal layer in between; and
an electrode disposed on a surface of one or both of the first substrate and the second substrate and generating, in the liquid crystal layer, an electric field in a direction orthogonal to or intersecting with a normal to the first substrate.

The present application contains subject matter related to that disclosed in Japanese Priority Patent Application 2011-147160 filed in the Japan Patent Office on Jul. 1, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A liquid crystal display including a liquid crystal display panel, and a drive circuit driving the liquid crystal display panel, the liquid crystal display panel comprising:
a liquid crystal layer including a liquid crystal material with positive dielectric constant anisotropy;
a vertical alignment film being in contact with the liquid crystal layer;
a first substrate and a second substrate disposed to face each other with the liquid crystal layer in between; and
an electrode disposed on a surface of one or both of the first substrate and the second substrate and generating, in the liquid crystal layer, an electric field in a direction orthogonal to or intersecting with a normal to the first substrate,
wherein the drive circuit is configured to apply a first voltage to the electrode in a nematic phase temperature range and in an isotropic phase temperature range of the liquid crystal layer, the first voltage being predetermined as a voltage that allows birefringence produced in an isotropic phase to be substantially equal to birefringence produced in a nematic phase,
wherein the nematic phase birefringence is a phase birefringence in the nematic phase temperature range in which a direction of a director of the liquid crystal layer is changed by applying the electric field generated by the electrode, and
wherein the isotropic phase birefringence is a phase birefringence in the isotropic phase temperature range in which a direction of a director of the liquid crystal layer is dissipated or induced by applying the electric field generated by the electrode.

2. The liquid crystal display according to claim 1, wherein the drive circuit drives the electrode with use of two values including the first voltage and a second voltage different from the first voltage.

3. The liquid crystal display according to claim 2, wherein the second voltage is zero volts or a value close to zero volts.

4. A liquid crystal display including a liquid crystal display panel, and a drive circuit driving the liquid crystal display panel, the liquid crystal display panel comprising:
a liquid crystal layer including a liquid crystal material with positive dielectric constant anisotropy;
a vertical alignment film being in contact with the liquid crystal layer;
a first substrate and a second substrate disposed to face each other with the liquid crystal layer in between;
a pair of polarizing plates disposed to face each other with the first substrate and the second substrate in between; and
an electrode disposed on a surface of one or both of the first substrate and the second substrate and generating, in the liquid crystal layer, an electric field in a direction orthogonal to or intersecting with a normal to the first substrate,
wherein
the pair of polarizing plates satisfy a crossed nicols condition, and are in a state where their absorption axes are different by about 45 degrees from a direction of the electric field,
the drive circuit is configured to apply a first voltage to the electrode to perform white display in a nematic phase temperature range and an isotropic phase temperature range, and
the first voltage is predetermined as a voltage equal to or higher than a voltage at which light transmittance of the liquid crystal display panel is maximized when the temperature of the liquid crystal layer falls within the isotropic phase temperature range in which a direction of a director of the liquid crystal layer is dissipated or induced by applying the electric field by the electrode, while in the nematic phase temperature range, the direction of the director of the liquid crystal layer is changed by applying the electric field by the electrode.

5. The liquid crystal display according to claim 4, wherein the drive circuit drives the electrode with use of two values including the first voltage and a second voltage different from the first voltage.

6. The liquid crystal display according to claim 5, wherein the drive circuit applies the second voltage to the electrode to perform black display.

7. A liquid crystal display including a liquid crystal display panel, and a drive circuit driving the liquid crystal display panel, the liquid crystal display panel comprising:
a liquid crystal layer including a liquid crystal material with positive dielectric constant anisotropy;
a vertical alignment film being in contact with the liquid crystal layer;
a first substrate and a second substrate disposed to face each other with the liquid crystal layer in between;
a pair of polarizing plates disposed to face each other with the first substrate and the second substrate in between; and
an electrode disposed on a surface of one or both of the first substrate and the second substrate and generating, in the liquid crystal layer, an electric field in a direction orthogonal to or intersecting with a normal to the first substrate,
wherein
the pair of polarizing plates satisfy a parallel nicols condition, and are in a state where their absorption axes are different by about 90 degrees from a direction of the electric field, and
the drive circuit is configured to apply a first voltage to the electrode in a nematic phase temperature range and an isotropic phase temperature range, and
the first voltage is predetermined as a voltage equal to or higher than a voltage at which light transmittance of the liquid crystal display panel is minimized when the temperature of the liquid crystal layer falls within the isotropic phase temperature range in which a direction of a director of the liquid crystal layer is dissipated or induced by applying the electric field by the electrode, while in the nematic phase temperature range, the direction of the director of the liquid crystal layer is changed by applying the electric field by the electrode.

8. The liquid crystal display according to claim 7, wherein the drive circuit drives the electrode with use of two values including the first voltage and a second voltage different from the first voltage.

9. The liquid crystal display according to claim 8, wherein the drive circuit applies the second voltage to the electrode to perform white display.

* * * * *